US011646888B2

(12) United States Patent
Apsingekar et al.

(10) Patent No.: US 11,646,888 B2
(45) Date of Patent: *May 9, 2023

(54) SYSTEM FOR IMPROVING DATA SECURITY

(71) Applicant: The Prudential Insurance Company of America, Newark, NJ (US)

(72) Inventors: Venkatesh Sarvottamrao Apsingekar, San Jose, CA (US); Sahil Vinod Motadoo, Sunnyvale, CA (US); Christopher John Schille, San Jose, CA (US); James Francis Lavine, Corte Madera, CA (US)

(73) Assignee: THE PRUDENTIAL INSURANCE COMPANY OF AMERICA, Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/518,821

(22) Filed: Nov. 4, 2021

(65) Prior Publication Data

US 2022/0060331 A1 Feb. 24, 2022

Related U.S. Application Data

(63) Continuation of application No. 16/807,574, filed on Mar. 3, 2020, now Pat. No. 11,201,741.

(51) Int. Cl.
*H04L 9/32* (2006.01)
*G06F 21/60* (2013.01)
(Continued)

(52) U.S. Cl.
CPC .......... *H04L 9/3213* (2013.01); *G06F 21/602* (2013.01); *G06F 21/6245* (2013.01);
(Continued)

(58) Field of Classification Search
CPC ....... H04L 9/3213; H04L 9/30; H04L 9/3226; H04L 63/0414; H04L 2209/56;
(Continued)

(56) References Cited

U.S. PATENT DOCUMENTS

| 7,194,618 | B1 | 3/2007 | Suominen | |
| 7,873,169 | B2 * | 1/2011 | Zeng | H04L 9/3013 |
| | | | | 380/283 |

(Continued)

FOREIGN PATENT DOCUMENTS

| EP | 3570245 A1 * | 11/2019 | ............. G06F 21/60 |
| JP | 2020173783 A * | 10/2020 | ........... G06F 16/258 |

(Continued)

OTHER PUBLICATIONS

U.S. Appl. No. 16/807,646, filed Mar. 3, 2020 (Apsingekar).
U.S. Appl. No. 16/807,733, filed Mar. 3, 2020 (Apsingekar).
U.S. Appl. No. 16/807,809, filed Mar. 3, 2020 (Apsingekar).

*Primary Examiner* — Shahriar Zarrineh
(74) *Attorney, Agent, or Firm* — Baker Botts L.L.P.

(57) ABSTRACT

A system allows a user to store his personally identifiable information (PII) on a personal device. When a third party wants to access the user's PII (e.g., to update the PII or to retrieve the PII), a notification will be presented to the user on the personal device seeking consent to the access. The notification may inform the user as to what information is being requested and which entity is requesting the access. The requested access will be denied unless the user consents to the access. In this manner, the user is given control over the dissemination of his PII. Additionally, the system alters or adjusts the PII that is stored in third-party servers so that even if these servers are breached, the user's actual PII is not exposed.

18 Claims, 17 Drawing Sheets

(51) Int. Cl.
*H04L 9/30* (2006.01)
*H04L 9/40* (2022.01)
*G06F 21/62* (2013.01)

(52) U.S. Cl.
CPC .............. *H04L 9/30* (2013.01); *H04L 9/3226* (2013.01); *H04L 63/0414* (2013.01)

(58) Field of Classification Search
CPC ..... H04L 9/0891; H04L 9/0894; H04L 63/06; H04L 63/10; H04L 63/0428; G06F 21/602; G06F 21/6245
See application file for complete search history.

(56) References Cited

U.S. PATENT DOCUMENTS

| | | | | |
|---|---|---|---|---|
| 8,589,183 | B2 * | 11/2013 | Awaraji | G06F 21/6245 |
| | | | | 705/2 |
| 8,677,144 | B2 * | 3/2014 | Haider | H04L 9/0825 |
| | | | | 713/189 |
| 9,118,641 | B1 * | 8/2015 | Paris, III | G16H 10/60 |
| 10,078,524 | B2 * | 9/2018 | Harkins | H04L 63/08 |
| 10,552,637 | B1 | 2/2020 | Phillips | |
| 10,903,999 | B1 * | 1/2021 | Raman | H04L 9/14 |
| 2002/0010679 | A1 | 1/2002 | Felsher | |
| 2002/0078346 | A1 * | 6/2002 | Sandhu | H04L 9/3273 |
| | | | | 713/156 |
| 2006/0020795 | A1 | 1/2006 | Gasparini | |
| 2006/0026042 | A1 * | 2/2006 | Awaraji | G06F 21/6245 |
| | | | | 707/999.009 |
| 2007/0266031 | A1 * | 11/2007 | Adams | G06F 16/9535 |
| 2008/0270802 | A1 | 10/2008 | Ashley | |
| 2012/0210119 | A1 * | 8/2012 | Baxter | G06Q 30/0253 |
| | | | | 713/150 |
| 2012/0331567 | A1 | 12/2012 | Shelton | |
| 2014/0013452 | A1 | 1/2014 | Aissi | |
| 2014/0257047 | A1 * | 9/2014 | Sillay | H04L 63/10 |
| | | | | 600/595 |
| 2015/0149362 | A1 * | 5/2015 | Baum | G06F 21/602 |
| | | | | 705/51 |
| 2015/0332029 | A1 | 11/2015 | Coxe | |
| 2016/0098577 | A1 | 4/2016 | Lacey | |
| 2016/0147945 | A1 | 5/2016 | Maccarthy | |
| 2017/0132431 | A1 | 5/2017 | Gonzalez Blanco | |
| 2017/0140174 | A1 * | 5/2017 | Lacey | G06Q 20/4016 |
| 2017/0148014 | A1 | 5/2017 | Bouse | |
| 2017/0193249 | A1 | 7/2017 | Luria | |
| 2017/0237717 | A1 * | 8/2017 | Starosielsky | G06F 21/57 |
| | | | | 713/176 |
| 2018/0089461 | A1 * | 3/2018 | Williams | G06Q 20/3829 |
| 2018/0124035 | A1 * | 5/2018 | Price | H04L 63/061 |
| 2019/0036708 | A1 | 1/2019 | Fregly | |
| 2019/0052622 | A1 * | 2/2019 | Karroumi | H04L 9/3247 |
| 2019/0108255 | A1 | 4/2019 | Tabak | |
| 2019/0109706 | A1 * | 4/2019 | Peterson | G06F 16/903 |
| 2019/0109830 | A1 | 4/2019 | McFarland | |
| 2019/0297060 | A1 | 9/2019 | Iverson | |
| 2019/0355059 | A1 * | 11/2019 | Liberman | H04L 9/50 |
| 2020/0007333 | A1 | 1/2020 | Young | |
| 2020/0145498 | A1 | 5/2020 | Grayson | |
| 2020/0280854 | A1 * | 9/2020 | Kunz | H04L 9/083 |
| 2020/0311299 | A1 | 10/2020 | Amar | |
| 2020/0327540 | A1 | 10/2020 | Chavarria | |
| 2020/0374129 | A1 | 11/2020 | Dilles | |
| 2020/0387623 | A1 | 12/2020 | Bayon | |
| 2020/0396221 | A1 | 12/2020 | Shaffer | |
| 2021/0176054 | A1 * | 6/2021 | Zabar | H04L 9/0825 |
| 2021/0224788 | A1 | 7/2021 | Kurylko | |

FOREIGN PATENT DOCUMENTS

| | | |
|---|---|---|
| KR | 101528785 B1 * | 6/2015 |
| KR | 20170007222 A * | 1/2017 |

* cited by examiner

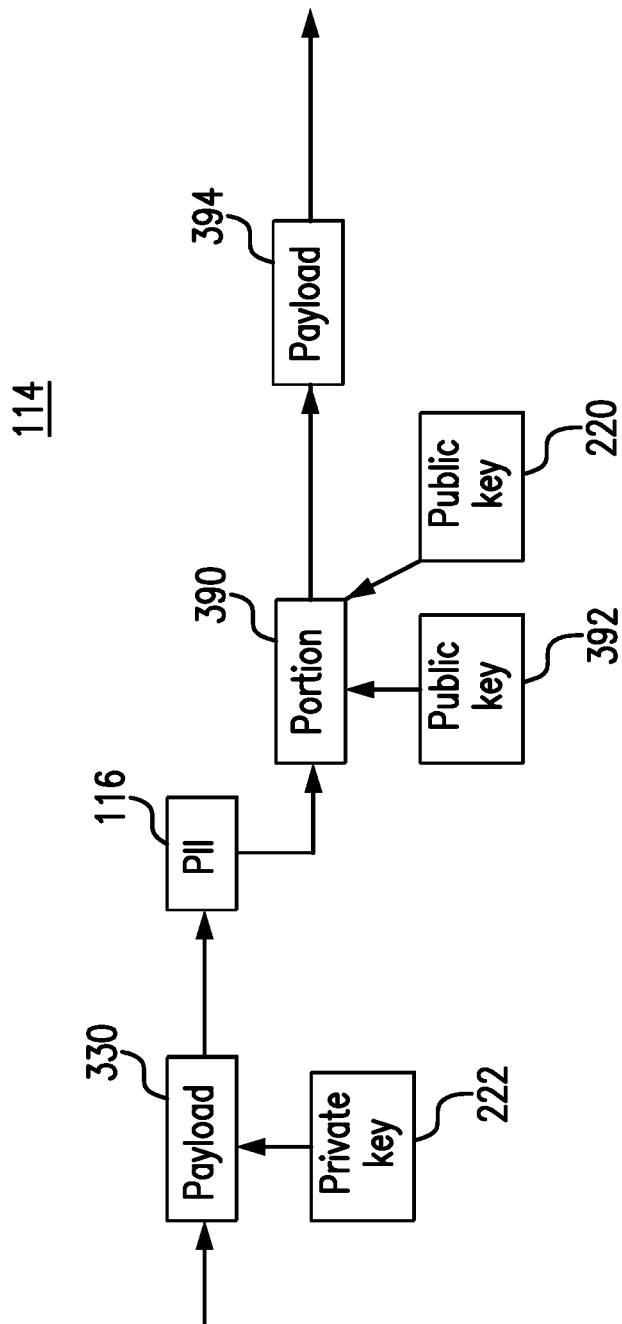

SYSTEM FOR IMPROVING DATA SECURITY

CROSS-REFERENCE TO RELATED APPLICATION

This application is a continuation of U.S. patent application Ser. No. 16/807,574, filed on Mar. 3, 2020 and entitled "SYSTEM FOR IMPROVING DATA SECURITY," now U.S. Pat. No. 11,201,741.

TECHNICAL FIELD

This disclosure relates generally to a system that protects against unwanted access to stored information (e.g., a user's personally identifiable information).

BACKGROUND

Users provide their information (e.g., name, address, telephone number, email address, social security number, etc.) in a variety of contexts (e.g., mortgage applications, credit card applications, financial account applications, air travel ticket orders, medical office visits, etc.). If this information were exposed to or taken by a malicious user, then the malicious user would be able to use this information to impersonate the users to conduct undesired or unwanted transactions.

SUMMARY OF THE DISCLOSURE

Users provide information (e.g., name, address, telephone number, email address, social security number, etc.) in a variety of contexts (e.g., mortgage applications, credit card applications, financial account applications, air travel ticket orders, medical office visits, etc.). If this information were exposed to or taken by a malicious user, then the malicious user would be able to use this information to impersonate the users to conduct undesired or unwanted transactions.

In conventional systems, the users have very little control over this information. The users provide their information to a provider to gain access to goods or services from the provider. The provider maintains the information (e.g., on a server). If that server were to be breached by a malicious user, the information would be exposed to the malicious user. Additionally, some providers even sell the information to other providers, often unbeknownst to the users. This sale and movement of the information further exposes the information to malicious users and lessens the control that the users have over such information.

This disclosure contemplates an unconventional system for securing information (e.g., a user's personally identifiable information (PII)). Generally, the system allows the user to store his PII on a personal device, such as a smartphone. When a third party wants to access the user's PII (e.g., to update the PII or to retrieve the PII), a notification will be presented to the user on the personal device seeking consent to the access. The notification may inform the user as to what information is being requested and which entity is requesting the access. The requested access will be denied unless the user consents to the access. In this manner, the user is given control over the dissemination of his PII. Additionally, the system alters or adjusts the PII that is stored in third-party servers so that even if these servers are breached, the user's actual PII is not exposed.

According to an embodiment, a system includes a device of a user and a token handler separate from the device. The device receives personally identifiable information the user and encrypts the personally identifiable information to produce first encrypted personally identifiable information. The token handler receives the first encrypted personally identifiable information from the device of the user, decrypts the first encrypted personally identifiable information to produce the personally identifiable information, generates a token representing the personally identifiable information, and receives the token indicating a request for the personally identifiable information. The device receives consent from the user to provide the personally identifiable information in response to the request for the personally identifiable information, in response to receiving the consent from the user, encrypts the personally identifiable information to produce second encrypted personally identifiable information, and communicates the second encrypted personally identifiable information to the token handler.

When PII is to be stored or updated, the system first seeks consent from the user for the PII store or update. If the user grants consent, then the system stores the PII in the user's personal device or updates the PII stored in the user's personal device. The system then generates a token representing the PII. The token can be presented at a later time to redeem or access the PII, subject to the user's consent. Even if the token were taken by a malicious user, it would not be possible for the malicious user to determine the user's actual PII from the token. In this manner, the security of the PII is improved over conventional systems.

According to an embodiment, a system includes a token handler and a device of a user separate from the token handler. The token handler receives, from a data originator, a request to store a user's personally identifiable information, the request to store comprising the user's personally identifiable information encrypted using a public encryption key of the token handler and inserts into a first queue the request to store. The device establishes a connection with the token handler. The token handler updates a status of the request to store in a second queue in response to determining that the device has established the connection. In response to the updated status of the request to store in the second queue and after establishing the connection, the device presents a notification message to the user seeking consent to store the user's personally identifiable information and in response to receiving the consent from the user, the device encrypts, using a salted passphrase of the user, the user's personally identifiable information encrypted using the public encryption key of the token handler to produce the user's personally identifiable information encrypted using the public encryption key of the token handler and the salted passphrase and stores the user's personally identifiable information encrypted using the public encryption key of the token handler and the salted passphrase in a local repository. The token handler, in response to determining that the device has stored the user's personally identifiable information encrypted using the public encryption key of the token handler and the salted passphrase, generates a token representing the personally identifiable information, and further updates the status of the request to store in the second queue.

When a third party wants to redeem the user's PII, the third party presents to the system the token, which indicates a request for the PII represented by the token. The system seeks consent from the user for sending the PII to the third party. If the user grants consent, then the system prepares the PII for the third party. In some embodiments, the third party can receive the PII directly from the system.

In certain embodiments, tokens are not directly accessible by third parties. Instead, when a third party wants to redeem the user's PII, the third party presents to the system anonymized data, which indicates a request for the PII used to form the anonymized data. The token handler then uses the anonymized data to select a suitable data access token.

In some embodiments, the objective of presenting anonymized data or a data access token is to obtain a service. During redemption, the PII is dispatched to a third party service to be used to make a request for that service. For example, consider an organization wishing to grant a consultant temporary access to a database when she joins that organization, and revoke that access when her employment concludes. The database is accessed by a database server and is protected by a username and a password. With the contemplated system, the organization can give the consultant temporary credentials and later revoke them without revealing or altering the true database credentials. Additionally, assume there is another server that can proxy the database server. When presented with anonymized versions of the username and password in a database query submitted by the consultant, the proxy server can look up a token to redeem the anonymized credentials for the real database credential on the employee's behalf. Subsequently, the token handler obtains the real database credentials and injects the real credentials into the database query. The proxy then submits the query to the database server for processing. Thus, the consultant gained access to the database but not access to the real database credentials. When the consultant's employment concludes, the data access token associated with her anonymized username and password is removed from the token handler. If subsequent database queries are submitted with her credentials, they will fail. In such a scenario, the PII is secrets belonging to an organization. The data access tokens are entitlements.

In an embodiment, the credentials injected into the final database query in the above example are encrypted with a public key of the database server, securing them in transit between the proxy and the database server.

In an embodiment, the token may not be associated with any data; instead, it is simply an entitlement. For example, it may represent an entitlement to activate a subscription or service, potentially a free trial to a content streaming service. In this example, the anonymized data represents a code for access to the service. That access is controlled by the token, which may be updated, replaced, deleted, or configured to expire or throttle the user's access.

According to certain embodiments, a system includes a token handler and a device separate from the token handler. The token handler receives, from a data originator, a token representing personally identifiable information and in response to receiving the token from the data originator, inserts into a first queue a request to redeem personally identifiable information of a user corresponding to the personally identifiable information. The device stores the personally identifiable information encrypted using a public encryption key of the token handler and establishes a connection with the token handler. The token handler updates a status of the request to redeem in a second queue in response to determining that the device has established the connection. In response to the status of the request to redeem in the second queue and after establishing the connection, the device presents a notification message to the user seeking consent to redeem the personally identifiable information and in response to receiving the consent from the user, the device encrypts, using a public encryption key of the data originator, the personally identifiable information encrypted using the public encryption key of the token handler to produce the personally identifiable information encrypted using the public encryption key of the token handler and the public encryption key of the data originator and communicates the personally identifiable information encrypted using the public encryption key of the token handler and the public encryption key of the data originator to the token handler.

The system further protects PII by implementing an unconventional key management scheme. In this scheme, the system uses a set of keys rather than an individual key for encrypting PII. Different portions of the PII are encrypted using different keys from the set of keys. In this manner, even if a malicious user were to access a key, that key would not give the malicious user the ability to decrypt all of the PII. Additionally, the system generates a new set of keys periodically (e.g., once a month). The system also deletes sets of keys that are too old (e.g., six months old). As a result, even if a malicious user were to access a key, the usefulness of that key would be time limited.

According to an embodiment, a token handler includes a memory and a hardware processor. The processor generates a set of public encryption keys of the token handler and communicates the set of public encryption keys of the token handler to a data originator. The processor also receives, from the data originator, a request to store a user's personally identifiable information. The request to store includes a first portion of the user's personally identifiable information encrypted using a first public encryption key of the token handler from the set and a second portion of the user's personally identifiable information encrypted using a second public encryption key of the token handler from the set. The processor further adds, to an encryption schedule, an indication that the first portion of the user's personally identifiable information was encrypted using the first public encryption key and an indication that the second portion of the user's personally identifiable information was encrypted using the second public encryption key and receives, from the data originator, a token indicating a request for redemption of the first and second portions of the user's personally identifiable information. The processor also selects, based on the encryption schedule, a first private encryption key of the token handler corresponding to the first public encryption key and decrypts, using the first private encryption key, the first portion of the user's personally identifiable information encrypted using the first public encryption key to produce the first portion of the user's personally identifiable information. The processor further selects, based on the encryption schedule, a second private encryption key of the token handler corresponding to the second public encryption key and decrypts, using the second private encryption key, the second portion of the user's personally identifiable information encrypted using the second public encryption key to produce the second portion of the user's personally identifiable information.

Certain embodiments provide one or more technical advantages. For example, an embodiment gives users more control over their PII by allowing users to give consent before access to the PII is granted. As another example, an embodiment improves the security of PII by storing the PII on a user's personal device and/or by storing tokens representing the PII on third-party servers. As yet another example, an embodiment improves the security of PII by maintaining sets of keys and by generating new sets of keys and deleting old sets of keys periodically. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 3A-3G illustrate an example of storing and/or updating personally identifiable information using the system of FIG. 1;

DETAILED DESCRIPTION

Embodiments of the present disclosure and its advantages are best understood by referring to FIGS. 1 through 6C of the drawings, like numerals being used for like and corresponding parts of the various drawings.

Users provide information (e.g., name, address, telephone number, email address, social security number, etc.) in a variety of contexts (e.g., mortgage applications, credit card applications, financial account applications, air travel ticket orders, medical office visits, etc.). If this information were exposed to or taken by a malicious user, then the malicious user would be able to use this information to impersonate the users to conduct undesired or unwanted transactions.

In conventional systems, the users have very little control over their information. The users provide their information to a provider to gain access to goods or services from the provider. The provider maintains the information (e.g., on a server). If that server were to be breached by a malicious user, the information would be exposed to the malicious user. Additionally, some providers even sell the information to other providers, often unbeknownst to the users. This sale and movement of the information further exposes the information to malicious users and lessens the control that the users have over such information.

This disclosure contemplates an unconventional system for securing any type of information (e.g., a user's personally identifiable information (PII)). Generally, the system allows the user to store his PII on a personal device, such as a smartphone. When a third party wants to access the user's PII (e.g., to update the PII or to retrieve the PII), a notification will be presented to the user on the personal device seeking consent to the access. The notification may inform the user as to what information is being requested and which entity is requesting the access. The requested access will be denied unless the user consents to the access. In this manner, the user is given control over the dissemination of his PII. Additionally, the system alters or adjusts the PII that is stored in third-party servers so that even if these servers are breached, the user's actual PII is not exposed. The security tool will be described in more detail using FIGS. 1 through 6F. Although the following embodiments describe a security tool protecting PII, the security tool may be used to secure any type of information.

I. System Overview

Figure 1:
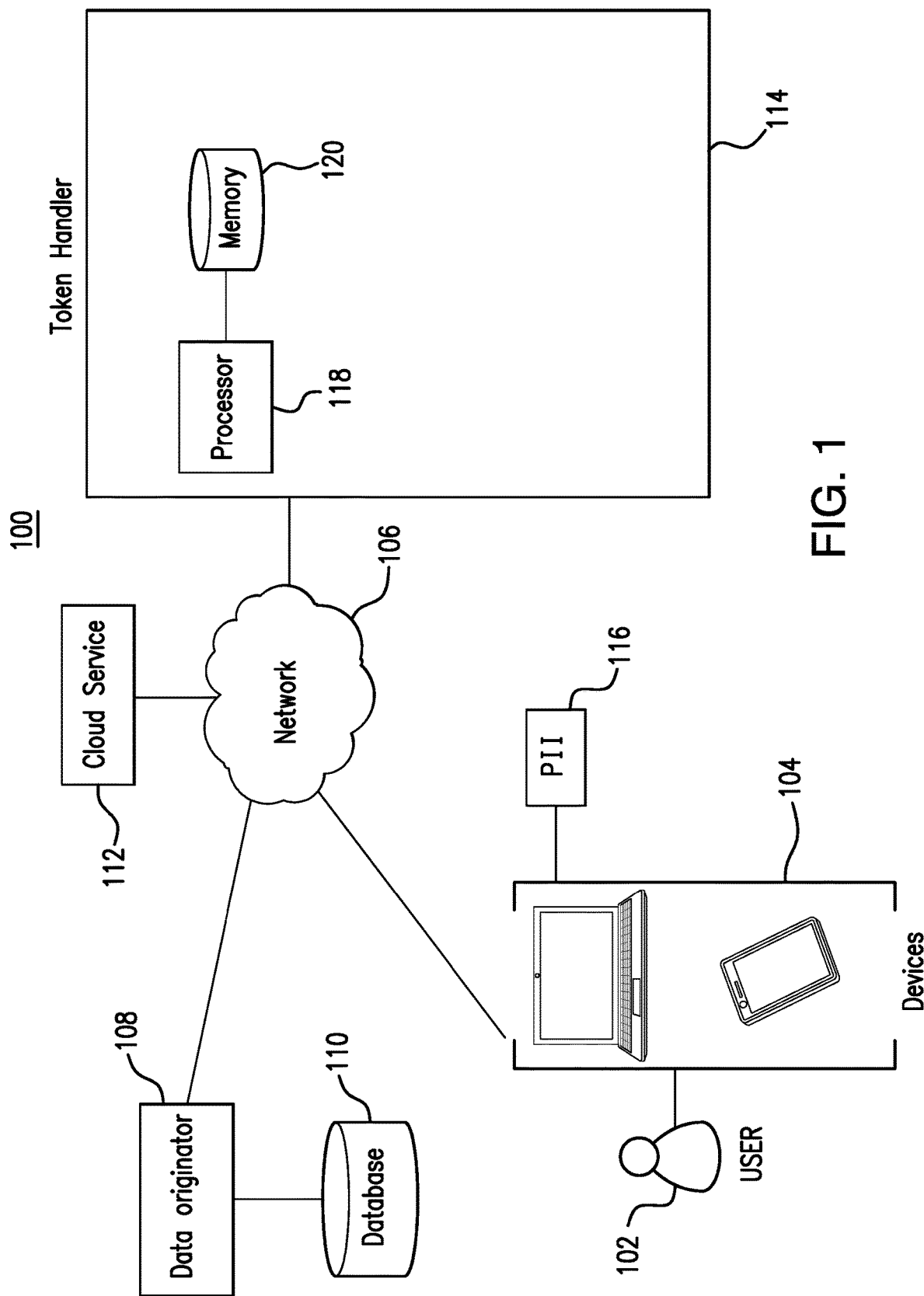
FIG. 1 illustrates an example system.

FIG. 1 illustrates an example system 100 for protecting information (e.g., PII). As seen in FIG. 1 system 100 includes one or more devices 104, a network 106, a data originator 108, a database 110, a cloud service 112, and a token handler 114. Generally, system 100 protects PII by storing a user's 102 PII in that user's 102 device 104. Access to that PII is denied unless the user 102 consents to the access.

Devices 104 interact with other components of system 100. Generally, users 102 use devices 104 to receive and/or transmit messages to other components of system 100. Devices 104 may store a user's 102 PII 116. User 102 may use devices 104 to grant or deny access to PII 116. In this manner, user 102 controls who has access to PII 116 and when.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. In some embodiments, an application executed by device 104 may perform the functions described herein.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Data originator 108 is a third party who may want access to PII 116. For example, data originator 108 may be a credit card company, a medical office, a bank, a brokerage, etc. Data originator 108 may use PII 116 to provide and/or apply for goods and services for user 102. Generally, when data originator 108 wants to access PII 116, data originator 108 first seeks approval from user 102 to access PII 116. If user 102 does not grant access to PII 116, then data originator 108 may not be provided access to PII 116. In this manner, it may be more difficult for a malicious user to take PII 116 from data originator 108.

Database 110 stores information for data originator 108. Generally, database 110 stores tokens representing PII 116 and/or altered versions of PII 116, also referred to as anonymized data. Data originator 108 can present the tokens and/or the anonymized data to indicate a request for PII 116. By storing tokens and/or anonymized data in database 110, the security of PII 116 is improved because a malicious user can only take tokens and anonymized data, rather than PII 116, from data originator 108 and/or database 110.

Cloud service 112 operates a storage system accessible through network 106. Generally, cloud service 112 can be used to store anonymized data and/or encrypted versions of PII 116. Various components of system 100 such as devices 104, data originator 108, and/or token handler 114 may access cloud service 112 to move information to and from other components of system 100.

Token handler 114 facilitates access to PII 116. As seen in FIG. 1, token handler 114 includes a processor 118 and a memory 120. This disclosure contemplates processor 118 and memory 120 being configured to perform any of the functions of token handler 114 described herein.

Processor 118 is any electronic circuitry, including, but not limited to microprocessors, application specific integrated circuits (ASIC), application specific instruction set processor (ASIP), and/or state machines, that communicatively couples to memory 120 and controls the operation of token handler 114. Processor 118 may be 8-bit, 16-bit, 32-bit, 64-bit or of any other suitable architecture. Processor 118 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 118 may include other hardware that operates software to control and process information. Processor 118 executes software stored on memory to perform any of the functions described herein. Processor 118 controls the operation and administration of token handler 114 by processing information received from devices 104, network 106, and memory 120. Processor 118 may be a programmable logic device, a microcontroller, a microprocessor, any suitable processing device, or any suitable combination of the preceding. Processor 118 is not limited to a single processing device and may encompass multiple processing devices.

Memory 120 may store, either permanently or temporarily, data, operational software, or other information for processor 118. Memory 120 may include any one or a combination of volatile or non-volatile local or remote devices suitable for storing information. For example, memory 120 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 120, a disk, a CD, or a flash drive. In particular embodiments, the software may include an application executable by processor 118 to perform one or more of the functions described herein.

Generally, token handler 114 processes requests to store and/or access PII 116. If user 102 consents to such storage and/or access, token handler 114 facilitates the movement of PII 116 through system 100. The information communicated in system 100 may be encrypted. The various components of system 100 (e.g., device 104, data originator 108, and/or token handler 114) may store or may be provided the public encryption keys of the other components such that each component of system 100 can encrypt messages intended for the other components of system 100. In certain embodiments, a component of system 100 receives the public encryption key of another component in response to a request for the public encryption key of that component. For example, data originator 108 and/or device 104 may request and receive the public encryption key of token handler 114. As another example, token handler 114 and device 104 may request and receive the public encryption key of data originator 108. The operation of system 100 will be described in more detail using FIGS. 2A through 6C.

II. Initial Device Registration

Figure 2A:
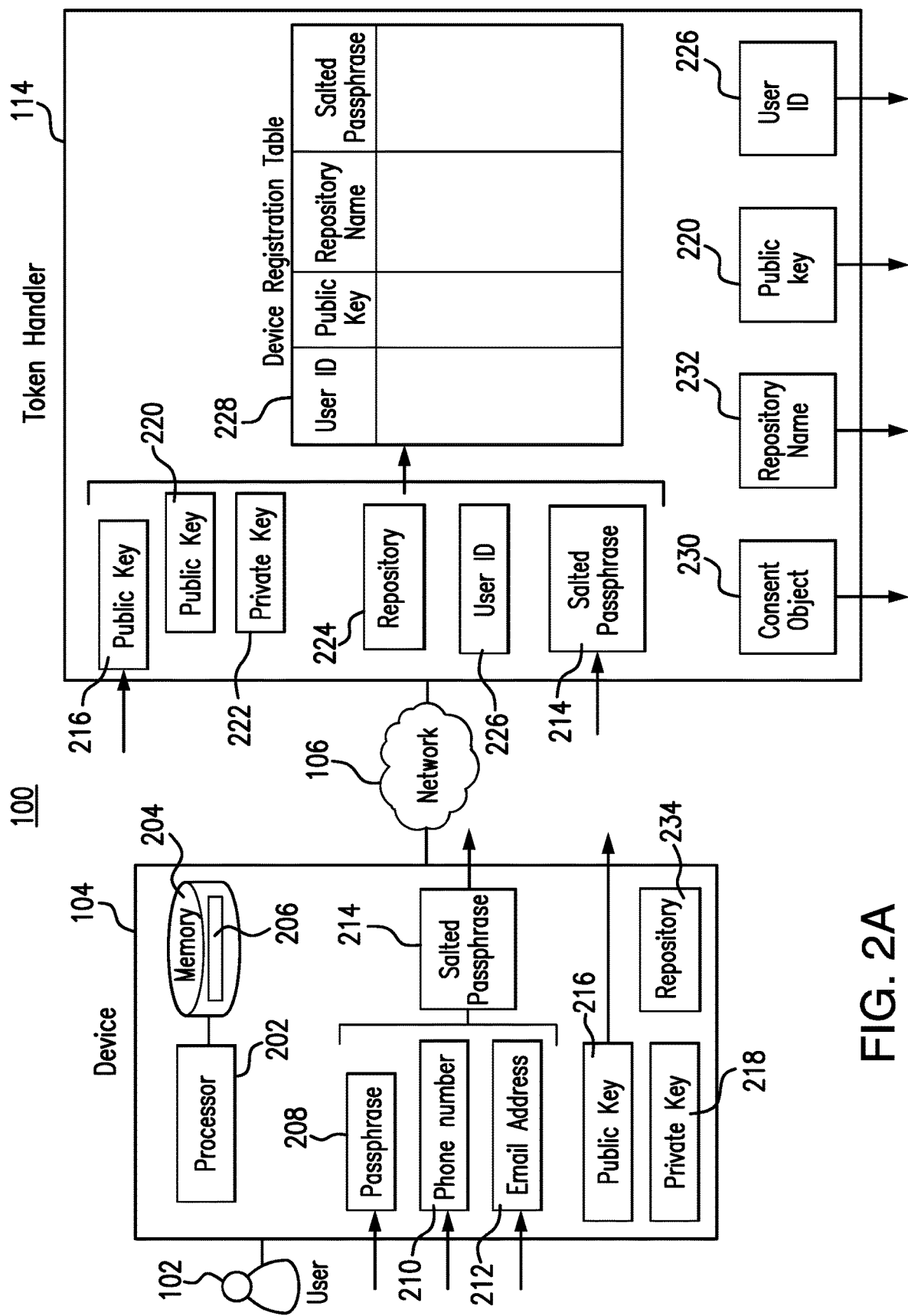
FIGS. 2A-2B illustrate an example device registration in the system of FIG. 1.
Figure 2B:
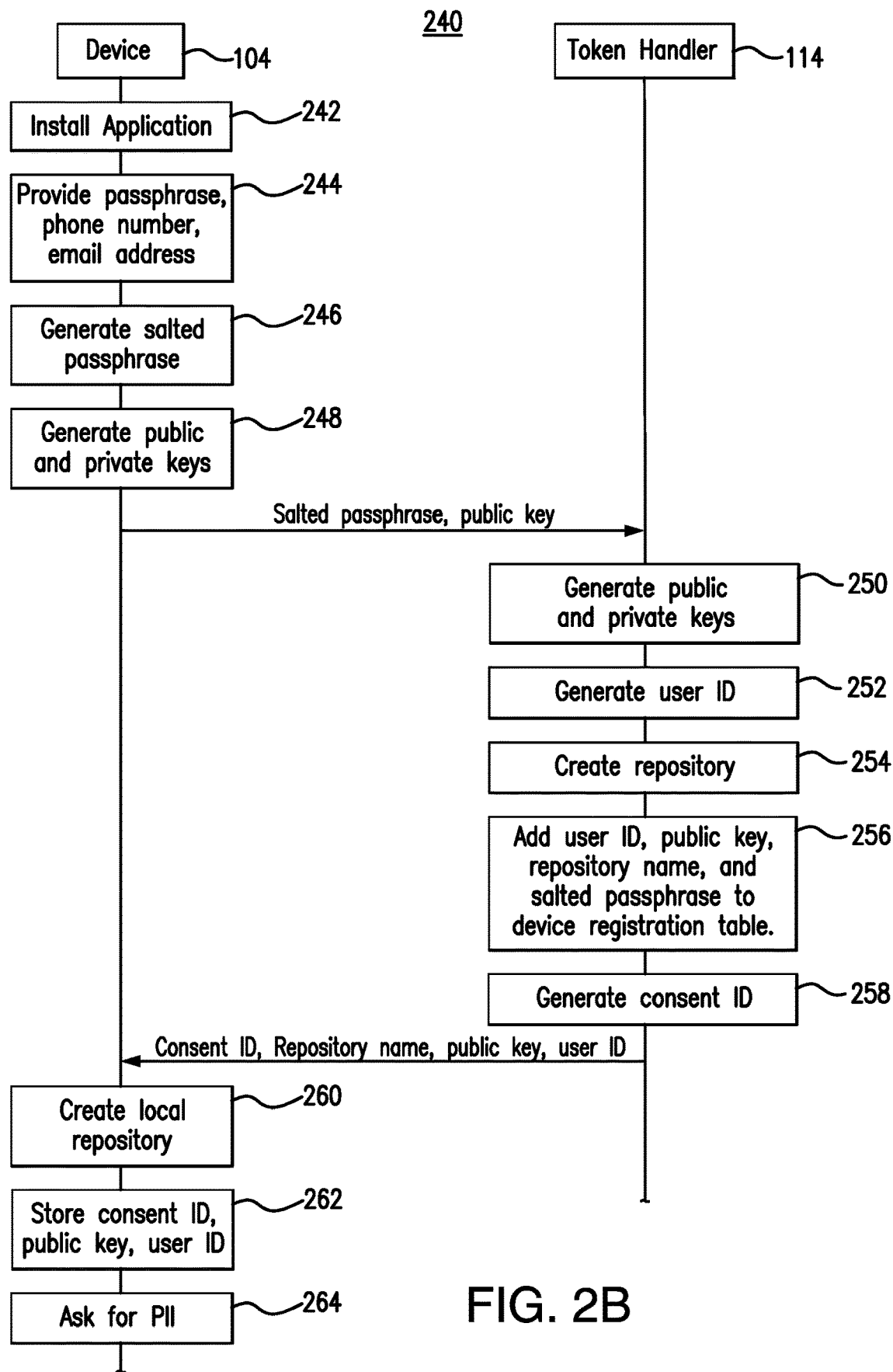

FIGS. 2A and 2B show an example of initial device registration in system 100 of FIG. 1. Generally, user 102 registers device 104 to gain access to the various components of system 100. The registration process creates an account for user 102 and allows token handler 114 to recognize user 102 and device 104 in the future.

FIG. 2A shows an example device 104 registration in system 100. As seen in FIG. 2A, device 104 includes a processor 202 and a memory 204. This disclosure contemplates processor 202 and memory 204 being configured to perform any of the functions of device 104 described herein. Generally, device 104 registers with token handler 114 by providing particular information about user 102 to token handler 114.

Processor 202 is any electronic circuitry, including, but not limited to microprocessors, application specific integrated circuits (ASIC), application specific instruction set processor (ASIP), and/or state machines, that communicatively couples to memory 204 and controls the operation of device 104. Processor 202 may be 8-bit, 16-bit, 32-bit, 64-bit or of any other suitable architecture. Processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 202 may include other hardware that operates software to control and process information. Processor 202 executes software stored on memory to perform any of the functions described herein. Processor 202 controls the operation and administration of device 104 by processing information received from devices 104, network 106, and memory 204. Processor 202 may be a programmable logic device, a microcontroller, a microprocessor, any suitable processing device, or any suitable combination of the preceding. Processor 202 is not limited to a single processing device and may encompass multiple processing devices.

Memory 204 may store, either permanently or temporarily, data, operational software, or other information for processor 202. Memory 204 may include any one or a combination of volatile or non-volatile local or remote devices suitable for storing information. For example, memory 204 may include random access memory (RANI), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 204, a disk, a CD, or a flash drive. In particular embodiments, the software may include an application executable by processor 202 to perform one or more of the functions described herein.

User 102 installs application 206 to device 104. For example, user 102 may download application 206 to device 104 and then install application 206. After installing application 206, device 104 may execute application 206 to perform any of the functions of device 104 described herein. For example, memory 204 may store application 206 and processor 202 may retrieve application 206 from memory 204 and execute application 206.

When user 102 launches application 206 for the first time, user 102 may provide information to application 206 to register. For example, user 102 may provide a username and/or passphrase 208 that authenticates user 102. User 102 may also provide other information during the registration process such as, for example, a phone number 210 and an email address 212. Device 104 uses this information to generate a salted passphrase 214 specific to user 102. For example, device 104 may hash passphrase 208 with phone number 210 and email address 212 to generate salted passphrase 214.

During the registration process device 104 may also generate a key pair for user 102. The key pair includes the public key 216 and the private key 218 for device 104. Public key 216 may be shared with other components of system 100 so that these components can encrypt information intended for device 104. Device 104 uses private key 218 to decrypt information encrypted using public key 216. Device 104 continues the registration process by communicating salted passphrase 214 and public key 216 to token handler 114. When token handler 114 receives the salted passphrase 214 and public key 216, token handler 114 may understand that user 102 is attempting to register. Token handler 114 uses salted passphrase 214 and public key 216 to generate additional information that will be used in the future to protect the PII 116 of user 102.

Token handler 114 generates a key pair for token handler 114 using public key 216. The key pair for token handler 114 includes public key 220 and private key 222. Public key 220 may be used by components of system 100 to encrypt messages intended for token handler 114. Token handler 114 uses private key 222 to decrypt information encrypted using public key 220. In some embodiments, public key 220 and private key 222 may be generated independent of public key 216. Thus, token handler 114 generates public key 220 and private key 222 without using public key 216. In this disclosure, when a public keypair is referenced, an asymmetric key can be substituted, or a symmetric key protected by an asymmetric keypair (e.g., a public key encodes a symmetric key) can be used.

In some embodiments, device 104 may encrypt passphrase 208 and other personal information (e.g., phone number 210 and email address 212) using public key 220 and send the encrypted information to token handler 114. Token handler 114 then hashes the encrypted information to generate salted passphrase 214. Token handler 114 then stores salted passphrase 214 in a table (e.g., device registration table 228).

Token handler 114 may generate a user ID 226 for user 102. In some instances, user 102 may have created user ID 226 and provided user ID 226 to token handler 114. User ID 226 may be an identifier for user 102.

Token handler 114 creates a repository 224 that stores information for user 102. For example, repository 224 may store tokens, anonymized data, and/or certain types of PII 116 for user 102. Token handler 114 may generate a repository name 232 for repository 224.

Token handler 114 adds certain information to a device registration table 228 to identify future requests from or to user 102. For example, token handler 114 may add public key 220, repository name 232, user ID 226, and a hash of salted passphrase 214 to device registration table 228. In certain embodiments, token handler 114 salts a provided passphrase encrypted with a public key of the token hander 114 in an authentication request. The token handler 114 constructs the salted passphrase and performs the hash, then looks for an entry matching this hash in its tables. If such an entry is found, the user is authenticated. Any of this information may be used as an index into device registration table 228 to locate any of the other information. For example, if public key 220 is provided, token handler 114 may retrieve user ID 226 and salted passphrase 214 from device registration table 228.

After token handler 114 has added the user's 102 information to device registration table 228, token handler 114 communicates certain information back to device 104. In the illustrated example of FIG. 2A, token handler 114 communicates a consent object 230, repository name 232, public key 220, and user ID 226. When device 104 receives this information, device 104 may consider that registration was successful. Device 104 may store this information for future use.

After device 104 receives information from token handler 114 device 104 may create a local repository 234. Device 104 may maintain repository 234 to store PII 116 of user 102. In some embodiments, device 104 may encrypt PII 116 using public key 220 and a key derived from salted passphrase 214 before storing PII 116 in repository 234. In this manner, even if a malicious user were to gain access to device 104, the malicious user will not be able to access PII 116 without getting token handler 114 and user 102 to decrypt PII 114.

In certain embodiments, device 104 may push repository 234 to cloud service 112. In this manner, a copy of repository 234 may be maintained and accessed over network 106. As a result, even if repository 234 and device 104 were to become corrupted, a correct copy of repository 234 may be retrieved from cloud service 112.

In some embodiments, user 102 may lock out an account if user 102 believes that the account has been compromised. User 102 may use device 104 or a web portal to request that the account of user 102 be locked out. In response, token handler 114 may lock out the account of user 102 so that future requests to access PII 116 of user 102 are rejected. In this manner, even if all of the security features provided by system 100 are breached by a malicious user, user 102 may still lock out the account as a final fail safe.

FIG. 2B illustrates a method 240 of registering a device 104. Generally, device 104 and token handler 114 perform the steps of method 240. By performing method 240 device 104 may be registered to system 100.

In step 242, device 104 installs application 206. Device 104 then provides passphrase 208, phone number 210, and email address 212 in step 244. Device 104 generates salted passphrase 214 in step 246. In some embodiments, device 104 generates salted passphrase 214 by combining and hashing passphrase 208, phone number 210, and email address 212. In step 248, device 104 generates public key 216 and private key 218. Device 104 then communicates salted passphrase 214 and public key 216 to token handler 114.

When token handler 114 receives hashed salted passphrase 214 and public key 216, token handler 114 may understand that device 104 is attempting to register. In another embodiment, device 104 may pass salted passphrase 214 to token handler 114, allowing token handler 114 to hash salted passphrase 214. In step 250, token handler 114 generates public key 220 and private key 222. In some embodiments, token handler 114 generates public key 220 and/or private key 222 based on public key 216. Token handler 114 generates user ID 226 in step 252. In some embodiments, token handler 114 may receive user ID 226 from user 102 and/or device 104 rather than generating user ID 226. In step 254, token handler 114 creates repository 224. Token handler 114 then adds user ID 226, public key 220, repository name 232, and hashed, salted passphrase 214 to device registration table 228. Token handler 114 communicates consent object 230, repository name 232, public key 220, and user ID 226 to device 104.

When device 104 receives consent object 230, repository name 232, public key 220, and user ID 226, device 104 may understand that registration has been successful. In step 260, device 104 creates local repository 234. Device 104 may store consent object 230, public key 220, and user ID 226 in local repository 234 in step 262. Device 104 may then request PII 116 from user 102. As user 102 provides PII 116, device 104 may store that PII 116 in repository 234. In some embodiments device 104 may first encrypt PII 116 using public key 220 and a key derived from salted passphrase 214 before storing in repository 234.

Modifications, additions, or omissions may be made to method 240 depicted in FIG. 2B. Method 240 may include more, fewer, or other steps. For example, steps may be performed in parallel or in any suitable order. Any suitable component of system 100 may perform one or more steps of the method 240.

III. Storing and Updating PII

Figure 3A:
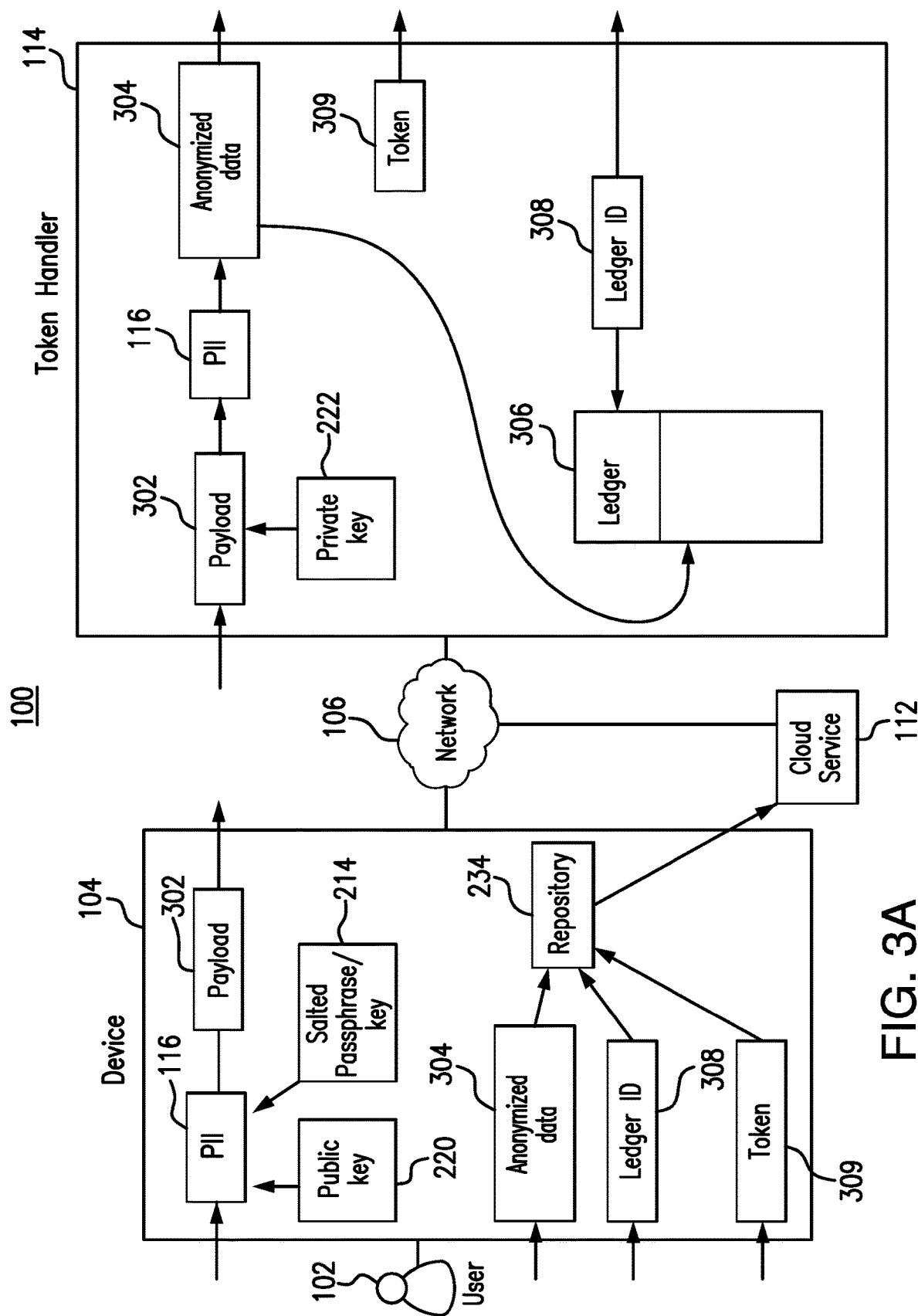
Figure 3B:
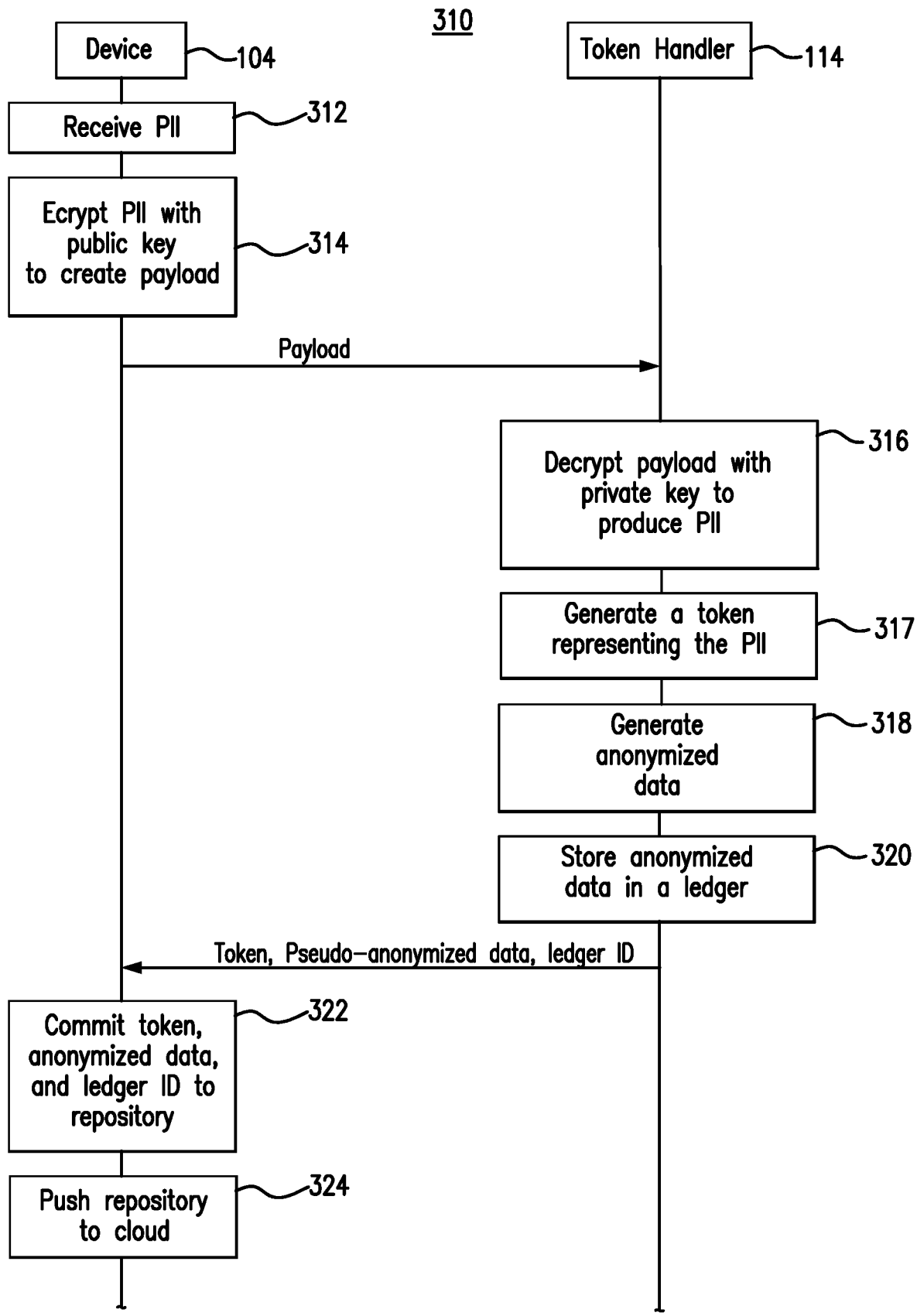
Figure 3C:
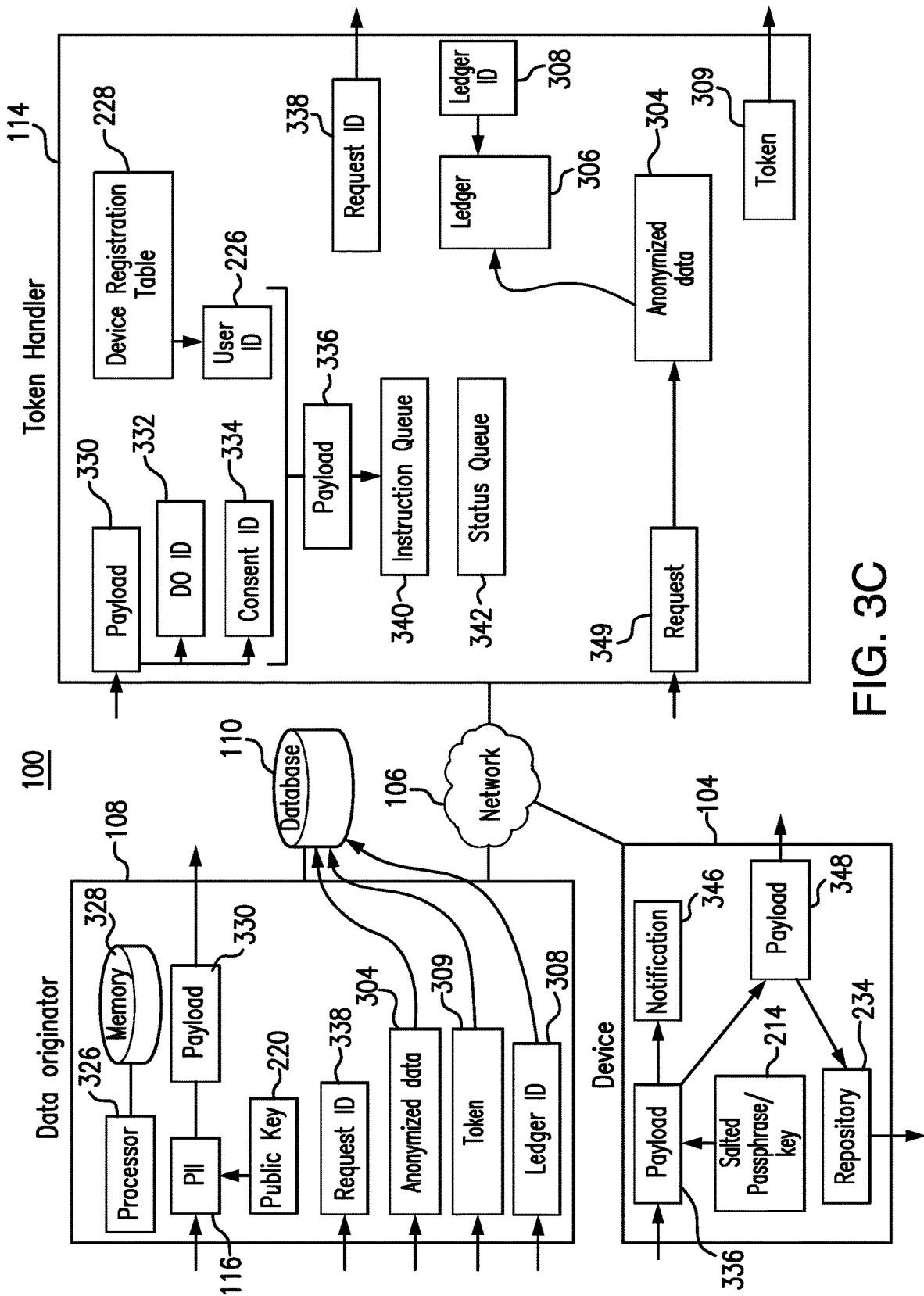
Figure 3D:
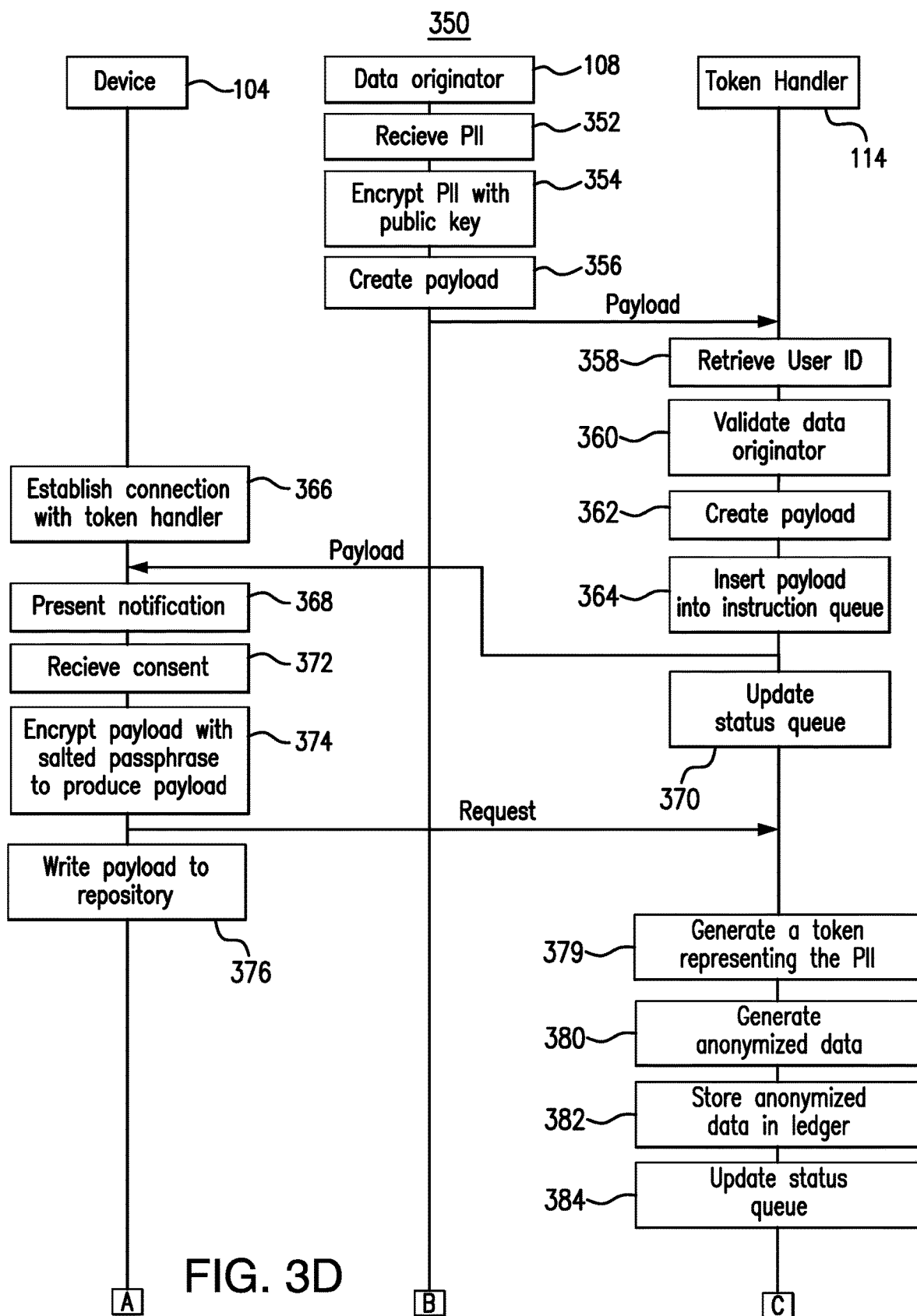
Figure 3E:
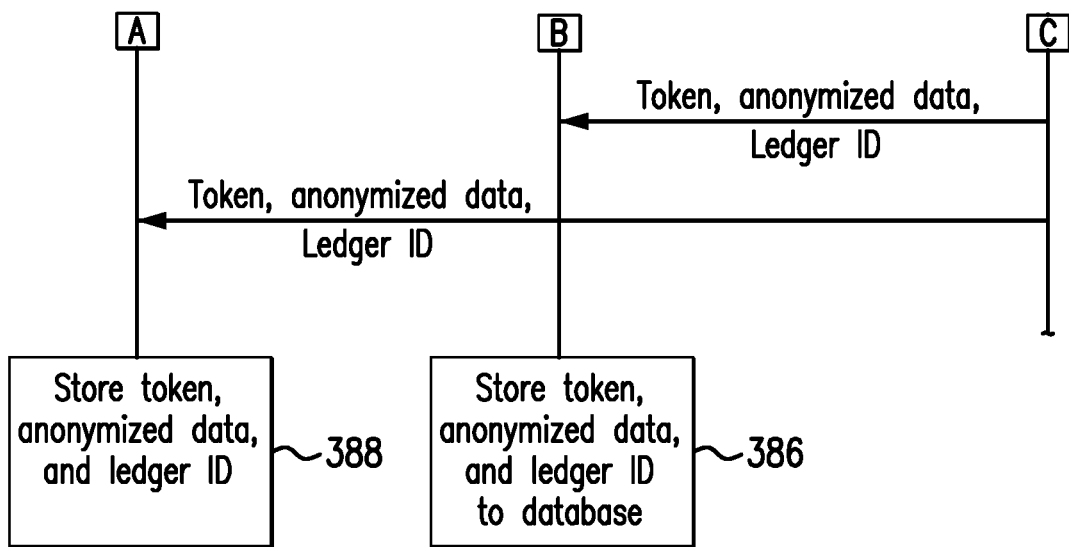
Figure 3G:
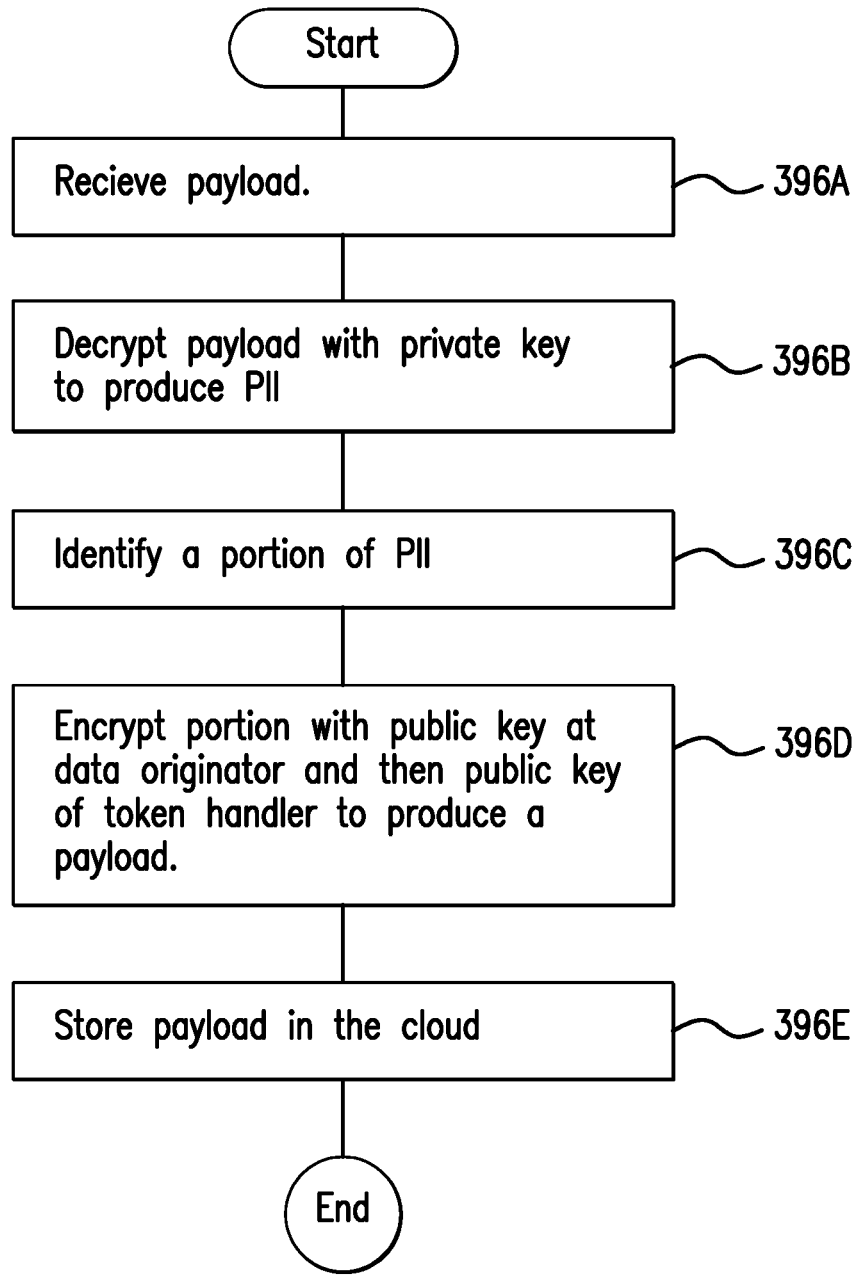

FIGS. 3A-3G show examples of storing and updating PII using system 100. FIGS. 3A and 3B show user 102 using device 104 to store or update PII in system 100. FIGS. 3C-3E show data originator 108 storing or updating PII in system 100. FIGS. 3F and 3G show token handler 114 storing or updating certain portions of PII. Generally, system 100 stores PII in device 104 after user 102 gives consent, and system 100 provides a token and/or anonymized data to other components (e.g., data originator 108). In this manner, user 102 controls access to the PII using device 104, and a malicious user can take only tokens and/or anonymized data from the other components of system 100.

A. Storing and Updating PII with a User Device

FIG. 3A shows the storing and/or updating of PII 116 using device 104 in system 100. Generally, user 102 can create or update PII 116 using device 104. Device 104 can store PII 116 for future redemption. Token handler 114 generates anonymized data for PII 116 that can be maintained by third parties and used by third parties in the future to redeem PII 116. In this manner, user 102 and device 104 control access to PII 116.

Device 104 receives PII 116 from user 102. User 102 may have created new PII 116 and inputted PII 116 into device 104. User 102 may have updated existing PII 116 by inputting PII 116 into device 104. Device 104 then encrypts PII 116 using public key 220 of token handler 114 to create payload 302. In some embodiments, device 104 may store PII 116 that has been encrypted using public key 220 for future redemption. Device 104 communicates payload 302 to token handler 114 to generate anonymized data and/or a token. Token handler 114 receives payload 302 from device 104. Token handler 114 may decrypt payload 302 with private key 222 of token handler 114.

In some embodiments, after encrypting PII 116 using public key 220, device 104 encrypts PII 116 using a key derived from salted passphrase 214 to create payload 302, which is PII 116 encrypted by public key 220 and then salted passphrase 214. In other words, payload 302 is a doubly encrypted version of PII 116. In this manner, even if a malicious user were to access a private encryption key of token handler 114 and to intercept payload 302, the malicious user would not be able to fully decrypt payload 302 to access PII 116 without salted passphrase 214. Additionally, if the malicious user were to access device 104, the malicious user would not be able to decrypt payload 302 without salted passphrase 214. Device 104 then writes payload 302 to the repository 234. The repository 234 changes would then be replicated in the cloud 112. This would bypass the data authenticity mechanism, and the device 104 would request an additional step to generate tokens 309 and anonymized data 304.

Token handler 114 generates one or more tokens 309 that represent stored information (e.g., PII 116, anonymized data 304, and/or ledger ID 308). A token 309 may indicate certain characteristics associated with the stored information. For example, token 309 may govern the entities that are allowed to access the information. As another example, token 309 may govern when access may be granted to and/or the manner in which access is provided to the information. As yet another example, token 309 may indicate where the information is stored (e.g., on device 104, on a server, and/or in the cloud) and/or for how long token 309 is valid and/or how many times the token can be redeemed, or how many times it can be redeemed during a prescribed interval of time. As yet another example, tokens 309 may specify how long redeemed data may reside in token handler's 114 cache memory. Tokens 309 may be provided to different components of system 100 and/or different users so that these components and users can later redeem and/or access the information (e.g., PII 116) by presenting token 309. Token 309 further protects the information because even if a malicious user were to access token 309, the malicious user would not be able to determine or derive the information from token 309. Additionally, user 102 may prevent access to the information by deleting or instructing the deletion of token 309 from system 100. In this manner, if token 309 is subsequently presented for redemption, token handler 114 may prevent access to the information.

In particular embodiments, token 309 may indicate the logging requirements as token 309 and/or PII 116 is moved through system 100. For example, token 309 may indicate that logging should be performed each time token 309 and/or PII 116 is stored and/or redeemed. The resulting logs may be stored and/or redeemed in the same way that PII 116 is stored and/or redeemed, as described herein. The logging will allow user 102 and system administrators to track which entities have performed which operations using token 309 and/or PII 116. The logs may not reveal the actual PII 116, thus protecting the user's 102 information. Additionally, by putting control of access to the log in the user's 102 hands, a reduction in log data volume and storage needs may result. Furthermore, by storing the log on device 104 where data is co-located, log searches may be performed by device 104 rather than by other components of system 100, thus reducing processing and I/O bandwidth relative to conventional server-side logging techniques.

In certain embodiments, token handler 114 generates anonymized data 304 representing PII 116. Token handler 114 may generate anonymized data 304 in any suitable manner. For example, token handler 114 may pre-generate a table of unique, suitable values and allocate and map values from the table to PII 116 to produce anonymized data 304.

Importantly, if a malicious user were to take anonymized data 304, the malicious user would not be able to glean PII 116 from anonymized data 304. In some instances, the malicious user may even believe that anonymized data 304 is PII 116, because anonymized data 304 may have the same format as PII 116. Importantly, anonymized data 304 is not a transformation of PII 116. In other words, it is not possible to determine or derive PII 116 from anonymized data 304 (e.g., by decrypting anonymized data 304 or by applying a reverse function to anonymized data 304).

As an example, if PII 116 were a social security number of user 102, token handler 114 may generate anonymized data 304 by generating a table of random social security numbers and allocating one of them in response to a request to generate an anonymized social security number. In this manner, anonymized data 304 still appears to be a social security number but is not a social security number of user 102. As another example, if PII 116 is the name of user 102, anonymized data 304 may use a sequence of random character values of PII 116. As a result anonymized data 304 may be a random string of characters. In both examples, if a malicious user were to access anonymized data 304, the malicious user would not be able to glean the user's social security number or name from anonymized data 304.

Token handler 114 stores anonymized data 304 in a ledger 306. Ledger 306 is identified by a ledger ID 308. Token handler 114 may have generated ledger ID 308 if ledger 306 was also newly generated. In this manner, anonymized data 304 and ledger ID 308 uniquely identify PII 116. As discussed further below, when token handler 114 is presented with anonymized data 304 and ledger ID 308, token handler will be able to determine that PII 116 and/or token 309 is being requested. Token handler 114 communicates anonymized data 304 and ledger ID 308 to other components of system 100, such as for example, device 104 and data originator 108 so that these components can later redeem PII 116 by presenting anonymized data 304 and ledger ID 308.

Device 104 receives token 309 and/or anonymized data 304 and ledger ID 308 from token handler 114. Device 104 stores token 309 and/or anonymized data 304 and ledger ID 308 in repository 234. In some embodiments, device 104 may further push repository 234 to cloud service 112 for storage on a cloud. As a result of this operation, device 104 stores a local copy of token 309 and/or anonymized data 304 and ledger ID 308. Additionally, device 104 stores a local copy of PII 116 encrypted using public key 220.

In some embodiments, device 104 may not store or maintain a local copy of PII 116, token 309, anonymized data 304, and/or ledger ID 308. Rather, device 104 stores this information on a server or in a cloud. In other words, device 104 may store payload 302, token 309, anonymized data 304, and/or ledger ID 308 in repository 234. Device 104 may then push repository 234 to the cloud or to a remote server for storage. Device 104 may then delete or erase local copies of PII 116, token 309, payload 302, anonymized data 304, and/or ledge ID 308. In this manner, this information may not be compromised if device 104 is taken by a malicious user.

As discussed previously, system 100 is not limited to the storage and/or updating of personally identifiable information. Rather, any type of information may be handled by system 100 to protect that information. For example, confidential information of a business or enterprise (e.g., database credentials) may be protected using system 100. Token 309 and/or anonymized data 304 and ledger ID 308 that correspond to the confidential information may be generated and stored in a similar manner that PII 116 is secured by system 100 (e.g., as described in FIGS. 3A-3G).

In some embodiments, token handler 114 further encrypts PII 116 with certain information (e.g., an identifier for user 102, an identifier for token handler 114, and/or an identifier for data originator 108) and stores the encrypted PII 116 for subsequent validation of PII 116 during redemption. For example, token handler 114 may store the encrypted PII 116 in a Merkle tree. During redemption, if requested PII 116 is provided using device 104 in response to a redemption request, token handler 114 can first verify the provided PII 116 by comparing it against the encrypted PII 116 stored in the Merkle tree. Token handler 114 may decrypt the encrypted PII 116 and then compare the two versions of PII 116 to see if the provided PII 116 has been altered. In this manner, even if user 102 decides to maliciously alter the provided PII 116, token handler 114 can detect and prevent that altered PII 116 from being provided.

FIG. 3B shows an example method 310 for storing and/or updating PII 116 using device 104. By performing method 310, device 104 is given control over access to PII 116. Device 104 receives PII 116 in step 312. User 102 may have inputted PII 116 into device 104. The user 102 may be creating PII 116 and/or updating PII 116 in device 104. In step 314, device 104 encrypts PII 116 with public key 220 to create a payload 302. In some embodiments, device 104 further encrypts PII 116 with a key based on salted passphrase 214 to form payload 302. In this manner, payload 302 is a doubly encrypted version of PII 116. Device 104 then communicates payload 302 to token handler 114.

Token handler 114 decrypts payload 302 with private key 222 of token handler 114 to produce PII 116. Token handler 114 generates token 309 that represents PII 116 in step 317. In step 318, token handler 114 generates anonymized data 304 for PII data 116. Token handler 114 may generate anonymized data 304 by generating random character sequences (for names) or nine digit numbers (for social security numbers), for example. In this manner, anonymized data 304 may resemble the format of PII 116, but not have the actual values of PII 116. As a result, a malicious user who gains access to anonymized data 304 will not be able to glean PII 116 from anonymized data 304. In some embodiments, token handler 114 scrambles PII 116 or generates a random string of characters and/or symbols to generate anonymized data 304.

In step 320, token handler 114 stores anonymized data 304 in a ledger 306. Ledger 306 may be identified by ledger ID 308. In the event that token handler 114 generated ledger 306 to store anonymized data 304, token handler 114 may also generate ledger ID 308 that identifies ledger 306. Token handler 114 then communicates token 309 and/or anonymized data 304 and ledger ID 308 to other components of system 100, such as device 104.

Device 104 may store token 309 and/or anonymized data 304 corresponding ledger ID 308. As a result, device 104 may store a local copy of token 309, anonymized data 304, ledger ID 308, and PII 116 encrypted using public key 220.

Modifications, additions, or omissions may be made to method 310 depicted in FIG. 3B. Method 310 may include more, fewer, or other steps. For example, steps may be performed in parallel or in any suitable order. Any suitable component of system 100 may perform one or more steps of the method 310.

B. Storing and Updating PII with a Data Originator

FIG. 3C shows the creation and/or updating of PII 116 by a third party, such as data originator 108. Data originator 108 may be any entity separate from user 102 and token handler 114. For example, data originator 108 may be an entity that provides a good or service to user 102 after user 102 has provided PII 116. Data originator 108 may be a medical office, financial institution, etc. Data originator 108 may include a number of agents that interact with user 102 and/or device 104. As seen in FIG. 3C, data originator 108 may include a processor 326 and a memory 328. Processor 326 and memory 328 may be configured to perform any of the functions of data originator 108 and/or its agents described herein.

Processor 326 is any electronic circuitry, including, but not limited to microprocessors, application specific integrated circuits (ASIC), application specific instruction set processor (ASIP), and/or state machines, that communicatively couples to memory 328 and controls the operation of data originator 108. Processor 326 may be 8-bit, 16-bit, 32-bit, 64-bit or of any other suitable architecture. Processor 326 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 326 may include other hardware that operates software to control and process information. Processor 326 executes software stored on memory to perform any of the functions described herein. Processor 326 controls the operation and administration of data originator 108 by processing information received from devices 104, network 106, and memory 328. Processor 326 may be a programmable logic device, a microcontroller, a microprocessor, any suitable processing device, or any suitable combination of the preceding. Processor 326 is not limited to a single processing device and may encompass multiple processing devices.

Memory 328 may store, either permanently or temporarily, data, operational software, or other information for processor 326. Memory 328 may include any one or a combination of volatile or non-volatile local or remote devices suitable for storing information. For example, memory 328 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 328, a disk, a CD, or a flash drive. In particular embodiments, the software may include an application executable by processor 326 to perform one or more of the functions described herein.

Data originator 108 receives PII 116 from user 102 and/or device 104. User 102 may have provided PII 116 to data originator 108 so that data originator 108 can provide a good or service to user 102. For example, if data originator 108 is a medical office, user 102 may have provided a name and/or address to the medical office to receive medical treatment. If data originator is a financial institution, user 102 may have provided PII 116 such as a name, address, and social security number to open an account with the financial institution.

After receiving PII 116, data originator 108 does not store PII 116 permanently. Rather, data originator 108 prepares PII 116 for handling by token handler 114. Data originator 108 encrypts PII 116 using public key 220 of token handler 114 to create payload 330. Data originator 108 then communicates payload 330 to token handler 114. In this manner, data originator 108 does not store PII 116, which improves the security of PII 116. For example, a malicious user will not be able to access PII 116 through data originator 108.

Token handler 114 receives payload 330 from data originator 108. Payload 330 may also include an identifier of data originator 108 (DO ID 332). Payload 330 may also include a consent ID 334. Payload 330 may also include information about user 102. Token handler 114 uses that information to index into device registration table 228 to determine the user 102 corresponding to PII 116. For example, token handler 114 may retrieve a user ID 226 from device registration table 228 using that information. Token handler 114 may also decrypt payload 330 using private key 222 of token handler 114 to access PII 116 (e.g., to generate token 309 and/or anonymized data 304).

Token handler 114 implements a polling system by which other components of system 100 may be notified of pending tasks. In other words, when token handler 114 needs device 104 and/or data originator 108 to perform a particular task, token handler 114 does not initiate contact with data originator 108 or device 104. Rather, token handler 114 waits for device 104 or data originator 108 to establish a connection with token handler 114 before token handler 114 informs device 104 or data originator 108 of any pending tasks. It is the responsibility of device 104 and data originator 108 to periodically establish a connection with token handler 114 to check if there are any pending tasks. In this manner, even if a malicious user were to acquire contact information for device 104 and/or data originator 108, the malicious user would not be able to spoof or impersonate token handler 114 and initiate contact with device 104 or data originator 108 and hijack device 104 and data originator 108. As a result, the security of device 104 and data originator 108 is improved.

Generally, token handler 114 uses one or more queues (e.g., instruction queue 340 and status queue 342) to manage the polling process. When device 104 and data originator 108 establish a connection with token handler 114, device 104 and data originator 108 check particular queues to determine any pending tasks and performs any of the pending tasks that token handler 114 wants device 104 and data originator 108 to perform. As seen in FIG. 3C, token handler 114 maintains an instruction queue 340 and a status queue 342. Token handler 114 uses these queues to let device 104 and/or data originator 108 know of pending tasks.

Token handler 114 generates a payload 336 using information from payload 330 and device registration table 228. Payload 336 indicates a request to store PII 116. Token handler 114 may also generate a request ID 338 that identifies the request to store PII 116. Token handler 114 may also use consent ID 334 to look up a token creation template and include it in the payload 336. The token creation template may include a description of what data will be written, a description of who may retrieve PII 116, and a description of the purposes for which PII 116 may be used. Token handler 114 inserts payload 336 into instruction queue 340 to inform other components of system 100 that the storage of PII 116 is requested. Token handler 114 may also update a status of the request in status queue 342 to requested or pending. Token handler 114 communicates request ID 338 to other components of system 100 such as data originator 108 so that those components can check on the status of the pending storage task. In this manner, components of system 100, such as data originator 108, may reference request ID 338 through a connection with token handler 114 to check the status of the pending storage task. For example, if data originator 108 sees that the status of a request corresponding to request ID 338 in status queue 342 is pending, then data originator 108 may determine that the request is still pending and wait.

After inserting payload 336 into instruction queue 340, token handler 114 waits for device 104 to establish a connection with token handler 114. As discussed above, device 104 establishes a connection with token handler 114 periodically according to the polling scheme. When device 104 establishes a connection with token handler 114, device 104 may see that payload 336 is waiting for device 104 in instruction queue 340. Token handler 114 may update the status of the request in status queue 342 to pending or in contact.

In response to seeing payload 336 in instruction queue 340, device 104 retrieves payload 336 from instruction queue 340. Device 104 generates a notification 346 that seeks consent from user 102 to allow the storage task from data originator 108. Notification 346 may include or be generated from anonymized data 304 included in payload 336. Notification 346 may include or be generated from consent language included in payload 336. Device 104 may generate notification 346 using the information in payload 336 such as, for example, the data originator ID 332, the user ID 226, and the consent ID 334. Device 104 may then present notification 346 to user 102 such as, for example, through a display. User 102 can give consent or deny consent. If user 102 denies consent, then device 104 and/or token handler 114 may reject the pending storage task. Token handler 114 may then update the status of the request in status queue 342 to rejected.

If user 102 gives consent for the pending storage task, then device 104 encrypts portions of payload 336 using salted passphrase 214 (or a key based on salted passphrase 214) to produce payload 348. In other words, payload 348 includes a doubly encrypted version of PII 116 that has been first encrypted using public key 220 and then encrypted using salted passphrase 214. Device 104 then stores payload 348 in repository 234. Before committing portions of payload 348 to repository 234, device 104 may include an encryption schedule describing what steps must be undertaken to decrypt portions of payload 348. Device 104 may further push repository 234 to cloud service 112.

Additionally, if user 102 gives consent, device 104 communicates a request 349 to token handler 114 indicating a request to generate token 309 and/or anonymized data 304. Request 349 may include a token creation template extracted from payload 348. Token handler 114 receives request 349 from device 104 and generates token 309 and/or anonymized data 304 in response. Token handler 114 then stores anonymized data 304 in ledger 306. As discussed previously, token handler 114 may generate or use ledger ID 308 to identify ledger 306. Token handler 114 may then store token 309 and/or anonymized data 304 and ledger ID 308 in a database or memory 120 (e.g., a cache of memory 120) for subsequent retrieval. Token handler 114 then updates the status of the storage request in status queue 342 to ready. In some embodiments, token handler 114 may store token 309 and/or anonymized data 304 and ledger ID 308 in status queue 342. As discussed previously, token 309 may indicate the access privileges and the manner and time in which the stored information is to be accessed.

Data originator 108 may poll token handler 114 to check the status of the pending storage task. When data originator 108 sees that the status is ready, data originator 108 may determine that the storage task is ready or complete. Data originator 108 may then retrieve token 309 and/or anonymized data 304 and ledger ID 308 from token handler 114 (e.g., from memory 120 or status queue 342). Data originator 108 may then store token 309 and/or anonymized data 304 and ledger ID 308 into database 110 for future use. For example, data originator 108 may present token 309 and/or anonymized data 304 and ledger ID 308 to token handler 114, to retrieve PII 116 in the future. In this manner, device 104 controls the storage of PII 116 in system 100.

In certain instances, token handler 114 may also initiate communication with other components of system 100 (e.g., device 104 and data originator 108) rather than waiting for these components to initiate communication with token handler 114 through the polling system. For example, token handler 114 may initiate communication when a request is urgent or in emergency situations. As another example, token handler 114 may initiate communication when token handler 114 knows that the component is ready and expecting a communication from token handler 114 (e.g., when the component has already initiated data storage or redemption).

FIGS. 3D and 3E shows a method 350 for storing PII 116 using data originator 108. Generally, when data originator 108 wants to store PII 116, device 104 should first give consent to the storage. If consent is given, anonymized data 304 and/or token 309 is generated using PII 116 and provided to data originator 108.

In step 352, data originator 108 receives PII 116. A user 102 may have used device 104 to provide PII 116. As another example, a user 102 may have provided PII 116 directly to data originator 108. Data originator 108 encrypts PII 116 with public key 220 of token handler 114 in step 354. Data originator 108 then creates payload 330 using the encrypted PII 116 in step 356. Payload 330 may also include identifying information for data originator 108 and user 102. Payload may also include a consent ID 230. Data originator 108 communicates payload 330 to token handler 114.

Token handler 114 receives payload 330 and retrieves a user ID 226 from a device registration table 228 using the information in payload 330 in step 358. Token handler 114 then validates the data originator in step 360. Validation may involve (1) authenticating the device of data originator 108 (2-way TLS) and retrieving registration data for data originator 108, (2) retrieving a consent object 230 and determining if data originator 108 has permission to use consent object 230, and (3) confirming that data originator 108 has sufficient privileges and authorization to store PII 116 of user 102 for subsequent retrieval or use as specified by consent object 230. User 102 may have previously provided such authorization. User 102 may also approve storage of some, all, or none of PII 116. Token handler 114 then creates payload 336 in step 362. Payload 336 may indicate the pending storage task. Token handler 114 inserts payload 336 into instruction queue 340 in step 364. Token handler 114 then waits for device 104 to establish a connection with token handler 114.

In step 366, device 104 establishes a connection with token handler 314. Device 104 may see that payload 336 is in instruction queue 340 indicating a pending request to store PII 116. Device 104 then retrieves payload 336 from token handler 114. In step 368, device 104 presents notification 346 seeking consent to store PII 116. Token handler 114 may update the status of the storage task in status queue 342 to pending in step 370. In step 372, device 104 receives consent from user 102 to store PII 116. Device 104 encrypts payload 336 using salted passphrase 214 to produce payload 348 in step 374. Device 104 then communicates request 349 to token handler 114. Device 104 may also write payload 348 to repository 234 in step 376. In certain embodiments, device 104 generates an unsigned token and adds the unsigned token to request 349. In some embodiments, user 102 may select which portions of PII 116 will be referenced by token 309.

Token handler 114 generates and/or signs token 309 representing portions of PII 116 in step 379. In step 380, token handler 114 generates anonymized data 304 representing PII 116. In some embodiments, token handler 114 generates a random string of characters and/or symbols to form anonymized data 304. In step 382, token handler 114 stores anonymized data 304 in ledger 306. Ledger 306 may be identified using ledger ID 308. In step 384, token handler 114 updates status queue 342 to indicate that the data is ready.

Token handler 114 then waits for data originator 108 to establish a connection with token handler 114. When data originator 108 establishes a connection with token handler 114, data originator 108 may see that the status of the storage task is ready. In response, data originator 108 retrieves token 309 and/or anonymized data 304 and ledger ID 308 from token handler 114. In step 386, data originator 108 stores token 309 and/or anonymized data 304 and ledger ID 308 to database 110 for future use.

In some embodiments, token handler 114 may push data to data originator 108 using, for example, a webhook called by the token handler 114 when token 309 and/or anonymized data 304 and ledger ID 308 are ready.

When device 104 establishes a connection with token handler 114, device 104 may retrieve token 309 and/or anonymized data 304 and ledger ID 308 from token handler 114. In step 388, device 104 stores pseudo-anonymized data 304 and ledger ID 388 for future use.

In this manner, user 102 and device 104 are given control over when PII 116 may be stored or updated. As a result, a malicious user will not be able to create fake PII 116 for user 102 because user 102 would not provide consent in response to notification 346 generated for storing the fake PII 116.

Modifications, additions, or omissions may be made to method 350 depicted in FIGS. 3D and 3E. Method 350 may include more, fewer, or other steps. For example, steps may be performed in parallel or in any suitable order. Any suitable component of system 100 may perform one or more steps of the method 350.

C. Storing, Updating, and Redeeming Permanent Data

FIG. 3F shows token handler 114 handling permanent data. Permanent data is a type of PII that is governed by particular laws and/or regulations. Typically, these laws or regulations may require that access be given to certain types of PII for certain purposes. To comply with these laws or regulations, token handler 114 would grant access to these types of PII without receiving consent from a user 102. Generally, token handler 114 identifies these types of PII and stores encrypted versions of this PII in a cloud so that token handler 114 can access this PII without first being granted permission by a user 102. In certain embodiments, token handler 114 may still seek consent from user 102 before accessing this PII, but in the event that the user 102 does not give consent, token handler 114 may still access the PII to comply with the laws or regulations.

Token handler 114 receives payload 330. As discussed above, payload 330 may include PII 116 that has been encrypted using public key 220 of token handler 114. Data originator 108 may have provided payload 330 to token handler 114. Token handler 114 decrypts payload 330 using private key 222 of token handler 114 to produce PII 116.

PII 116 may include certain types of PII 116 that are governed by laws or regulations. For example, these laws or regulations may require that access be given to PII 116 even without user consent. Token handler 114 may identify portions 390 of PII 116 that are governed by these laws or regulations. Token handler 114 may encrypt these portions 390 using a public key 392 of data originator 108 and then a public key 220 of token handler 114 to form a payload 394. As a result, portion 390 is doubly encrypted using keys of data originator 108 and token handler 114. Token handler 114 then stores payload 394 in a cloud for future retrieval and use. Because portion 390 has been encrypted using the keys of token handler 114 and data originator 108, token handler 114 and data originator 108 may decrypt portion 390 without intervention from device 104.

When data originator 108 requests the portion 390 of PII 116 (e.g., by communicating a request for portion 390 to token handler 114), token handler 114 may retrieve payload 394 from the cloud and decrypt payload 394 using private key 222 of token handler 114 to produce portion 390 encrypted using public key 392 of data originator 108. Token handler may then communicate portion 390 encrypted using public key 392 of data originator 108 to data originator 108. Data originator 108 may then decrypt, using a private key of data originator 108, portion 390 encrypted using public key 392 to produce portion 390. In this manner, data originator 108 can retrieve portion 390 even without user consent.

In some embodiments, token handler 114 still gives user 102 an opportunity to consent to the retrieval of portion 390. If user 102 consents, then the regular redemption of PII 116 can occur, as described below. If user 102 does not consent, then token handler 114 may provide portion 390 to data originator 108 using the process discussed above.

FIG. 3G shows an example method 396 for storing permanent data. In certain embodiments, token handler 114 performs method 396. By performing method 396, token handler 114 stores PII 116 that is governed by laws or regulations requiring access without consent.

In step 396A, token handler 114 receives payload 330. Token handler 114 decrypts payload 330 with private key 222 to produce PII 116 in step 396B. In step 396C, token handler 114 identifies a portion 390 of PII 116 that is governed by laws or regulations. These laws or regulations may require that access be given to portions 390 without user consent.

In step 396D, token handler 114 encrypts portion 390 with public key 392 of data originator 108, and then public key 220 of token handler 114 to produce a payload 394. Token handler 114 then stores payload 394 in the cloud in step 396E. Token handler 114 may also store payload 394 on the user's 102 device 104. In this manner, the data repository in the cloud 112 can remain consistent with the data repository 234 on the user's 102 device 104.

Modifications, additions, or omissions may be made to method 396 depicted in FIG. 3G. Method 396 may include more, fewer, or other steps. For example, steps may be performed in parallel or in any suitable order. Any suitable component of system 100 may perform one or more steps of the method 396.

IV. Redeeming PII

Figure 4A:
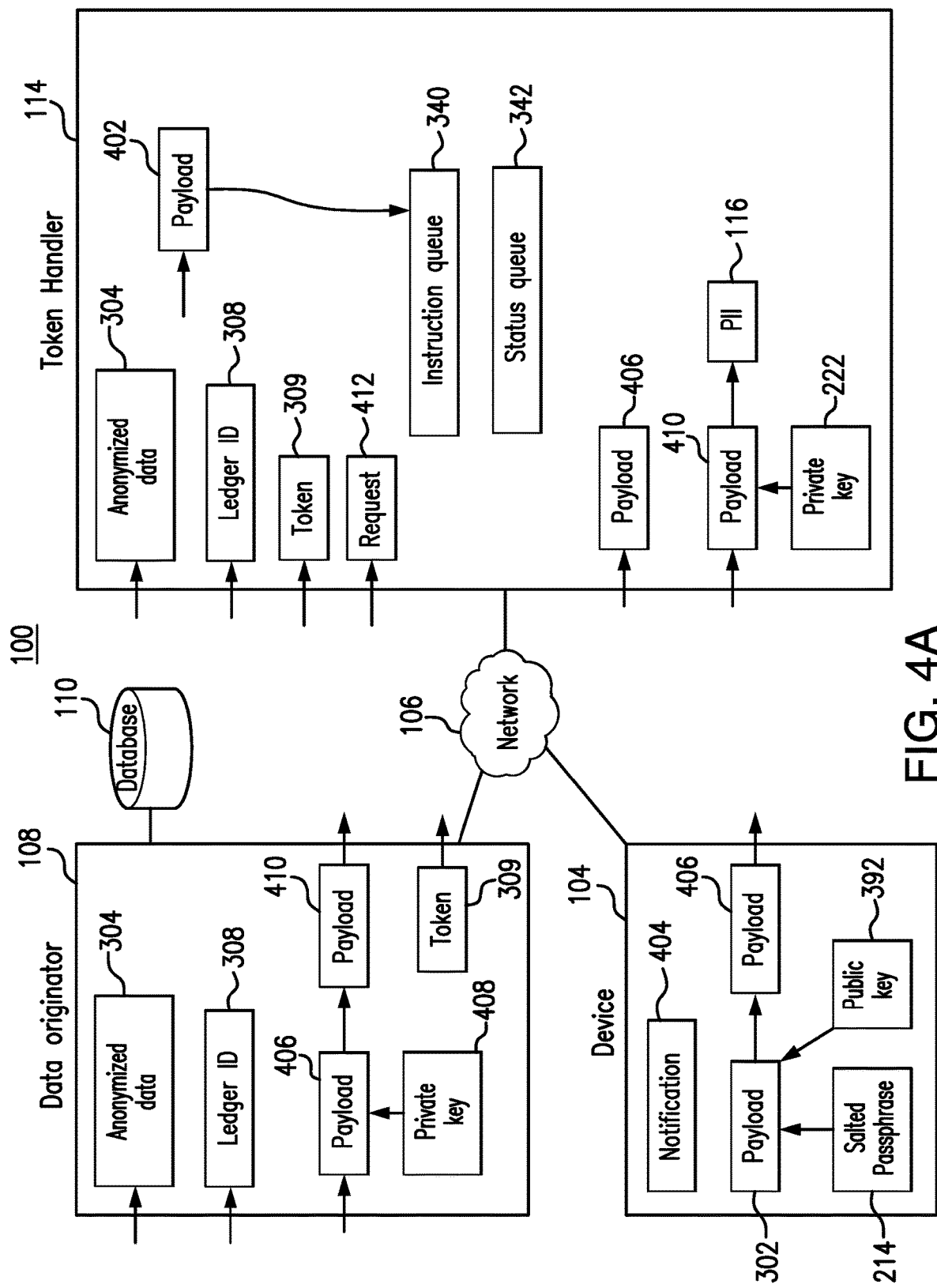
FIGS. 4A-4B illustrate an example of redeeming personally identifiable information using the system of FIG. 1.
Figure 4B:
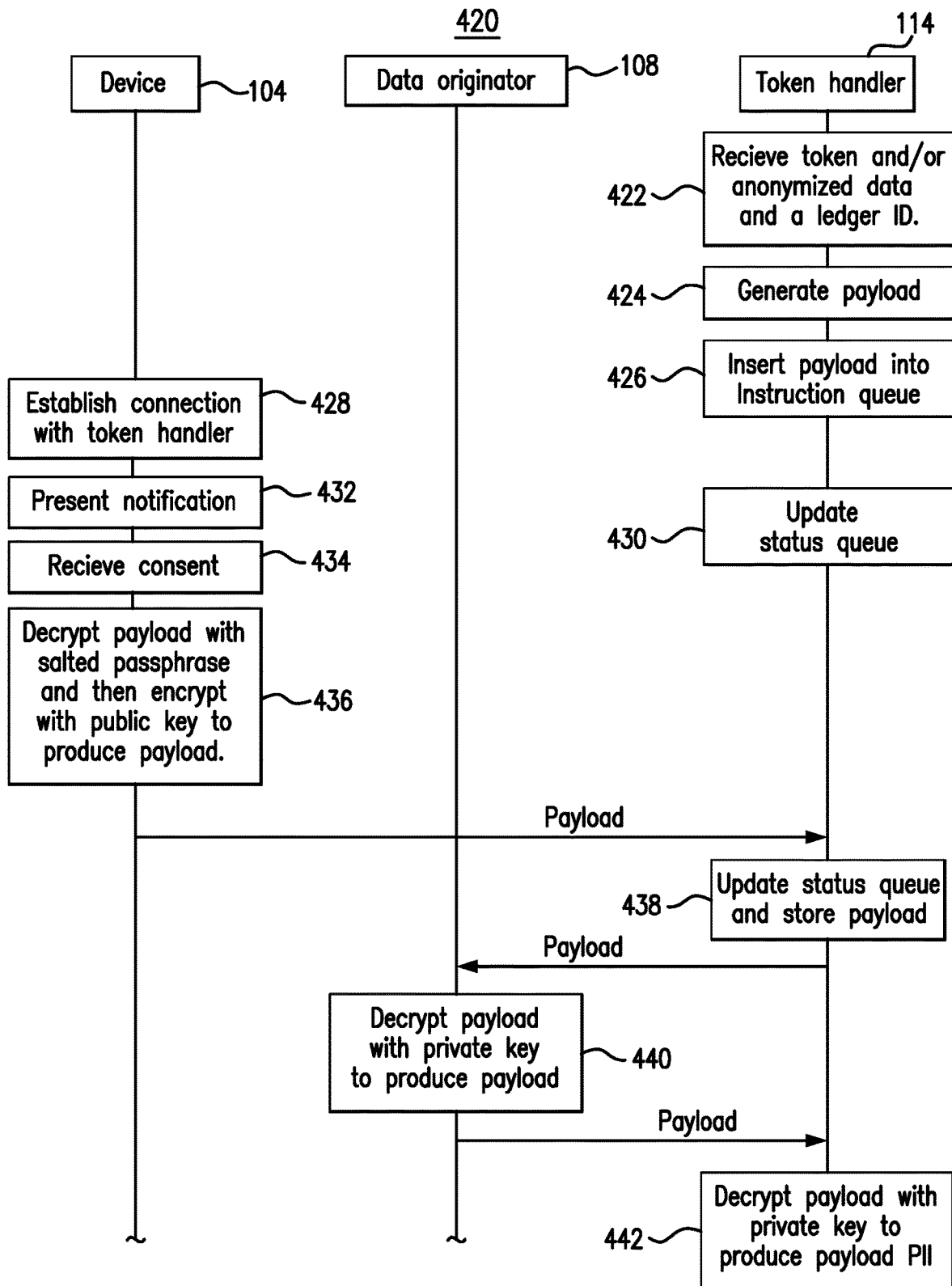

FIGS. 4A and 4B show an example of redeeming PII 116 in system 100. Generally, data originator 108 presents a token 309 and/or anonymized data 304 to indicate a request to obtain or use the PII 116. After user 102 consents to the request, token handler 114 performs a series of steps so that data originator 108 can receive the PII 116 or allow a third party to provide a service with the PII 116. In this manner, user 102 controls access to the PII 116.

FIG. 4A shows redemption of PII 116 in system 100. The process begins when token handler 114 receives token 309 and/or anonymized data 304 and ledger ID 308, indicating a request to redeem PII 116. As discussed previously, token 309 and anonymized data 304 and ledger ID 308 may uniquely identify PII 116. In addition, token 309 identifies data originator 108 and user 102. Data originator 108 may have retrieved token 309 and/or anonymized data 304 and ledger ID 308 from database 110. Data originator 108 communicates token 309 and/or anonymized data 304 and ledger ID 308 to token handler 114 to indicate a request to redeem PII 116. In some embodiments, the process begins with device 104 communicating token 309 and/or anonymized data 304 and ledger ID 308 to data originator 108 and/or directly to token handler 114. For example, data originator 108 may have asked user 102 to provide PII 116, and in response, user 102 uses device 104 to communicate token 309 and/or anonymized data 304 and ledger 308 to data originator 108 and/or token handler 114.

Token handler 114 receives token 309 and/or anonymized data 304 and ledger ID 308. Token handler 114 generates a payload 402 using token 309 and/or anonymized data 304 and ledger ID 308. Payload 402 indicates a request to redeem PII 116 corresponding to token 309 and/or anonymized data 304 and ledger ID 308. Token handler 114 inserts payload 402 into instruction queue 340. Token handler 114 may then wait for device 104 to poll token handler 114.

In certain embodiments, token handler 114 validates token 309 to determine whether data originator 108 is allowed to access PII 116 before further requesting consent from device 104. Token 309 is signed with a signature created with a private key 222 of token handler 114, and in this way, may guarantee that token 309 has not been altered by data originator 108 or a malicious user. Also, token 309 may designate data originator 108 as the legitimate user of token 309. Further, token 309 designates how PII 116 can be accessed or used. For example, token 309 may stipulate that PII 116 must be presented to another server rather than being made available to data originator 108.

While anonymized data 304 may map to token 309, token 309 may reference additional PII data elements for which data originator 108 did not supply a corresponding anonymized data item. Token handler 114 may exclude a missing data item from payload 402 to indicate to device 104 that the missing data item is not to be redeemed. In this manner, token handler 114 prevents device 104 from being presented with illegitimate redemption requests in the event that a malicious user accesses token 309 and/or anonymized data 304 and/or ledger ID 308, and further restricts data originator 108 from gaining access to data outside the purview of data originator 108, in the event that tokens are shared by multiple data originators. By designating data originator 108 as the legitimate user of token 309, token handler 114 prevents another user from intercepting or accessing and redeeming a token issued for use by data originator 108.

In some embodiments, data originator 108 presents token 309 and not anonymized data 304 and ledger ID 308 to request access to PII 116. Token handler 114 identifies from token 309 the PII 116 that is being requested. Token handler 114 may further refer to token 309 to determine whether certain security checks have passed (e.g., whether token 309 indicates that data originator 108 may request PII 116 at this time or in a particular manner or for a particular purpose by including, for example, a redirect URL for another service to receive PII 116). Token handler 114 performs the series of steps described below to redeem or provide PII 116 to data originator 108.

In some embodiments, data originator 108 presents anonymized data 304 and ledger ID 308 instead of token 309. Token handler 114 identifies from anonymized data 304 and ledger ID 308 a token 309 that corresponds to anonymized data 304 and ledger ID 308. Token handler 114 then identifies from token 309 that PII 116 is being requested. Token handler 114 may further refer to token 309 to determine whether certain security checks have passed (e.g., whether token 309 indicates that data originator 108 may request PII 116 at this time or in a particular manner). Token handler 114 performs the series of steps described below to redeem or provide PII 116 to data originator 108 or provide PII 116 to another service.

As discussed previously, device 104 periodically polls token handler 114 to see if there are any pending tasks waiting for device 104. When device 104 establishes a connection with token handler 114, device 104 may see payload 402 in instruction queue 340 and in response, determine that token handler 114 has received token 309 and/or anonymized data 304 and ledger ID 308, indicating a request to redeem PII 116. Token handler 114 may update a status for the request to redeem PII 116 in status queue 342 to pending. When device 104 sees payload 402 in pending queue 340, device 104 generates and presents notification 404 to user 102. Notification 404 requests consent from user 102 to redeem PII 116. User 102 may consent to revealing to or allowing data originator 108 to use all, some, or none of the PII 116 described in notification 404. If user 102 does not consent to reveal to or allow use of any portions of PII 116 to data originator 108, then the request to redeem PII 116 is denied and the status for the request to redeem PII 116 in status queue 342 is updated to denied.

If the user 102 consents, then device 104 retrieves payload 302. As described previously, payload 302 represents PII 116 encrypted using public key 220 of token handler 114 and then an encryption key derived from salted passphrase 214 of user 102. Device 104 may have retrieved payload 302 from the cloud, a server, or from a local repository 234. If payload 302 is stored on the cloud or a server, then device 104 effectively acts as a consent mechanism for gaining access to some or all of PII 116.

In some embodiments, consent to store and/or redeem PII 116 (or to perform any other task) may be required from and given by entities other than user 102. For example, token 309 may indicate other users 102 or other entities that need to provide consent before certain tasks (e.g., logging, redeeming, storing) can be performed. If these tasks are requested, token handler 114 may seek consent from these other users 102 or entities. Consent may be provided on devices of those other users 102 or entities. Consent may also be provided if those other users 102 or entities provide to token handler 114 tokens 309 that were generated for those users 102 and/or entities. When the required consent has been given, token handler 114 may commence the task.

Device 104 retrieves encrypted data from payload 302 according to the wishes of the user. Device 104 decrypts payload 302 using salted passphrase 214. Device 104 then encrypts the resulting payload 302 using public key 392 of data originator 108 to create payload 406. In other words, payload 406 represents PII 116 encrypted using public key 220 of token handler 114 and then public key 392 of data originator 108. Device 104 communicates payload 406 to token handler 114. In certain embodiments, token handler 114 may have retrieved public key 392 based on token 309 and/or anonymized data 304 and ledger ID 308. Token handler then communicates public key 392 to device 104. In some embodiments, device 104 decrypts payload 302 using salted passphrase 214 to produce PII 116 encrypted using public key 220 of token handler 114. Token handler 114 then applies encryption using public key 392 of data originator 108 to produce payload 406.

In some embodiments, token 309 may specify that data originator 108 receive certain items of anonymized data from payload 302 in place of corresponding data items from PII 116. Thus, payload 409 may include real data from PII 116 intermixed with portions of anonymized data 304.

Token handler 114 receives payload 406 from device 104. Token handler 114 stores payload 406 in memory 120 (e.g., in a cache of memory 120) and updates the status of the request for PII 116 in status queue 342 to ready. Token handler 114 may then wait for data originator 108 to poll token handler 114. In some embodiments, token handler 114 may store payload 406 in status queue 342. When data originator 108 establishes a connection with token handler 114, data originator 108 may see the status of the request in status queue 342 is ready indicating that the request to redeem has been approved and is ready. Data originator 108 may retrieve payload 406 from memory 120 or status queue 342 of token handler 114. Data originator 108 then decrypts payload 406 using private key 408 of data originator 108 to generate payload 410. Payload 410 may represent PII 116 encrypted using public key 220 of token handler 114. Data originator 108 then communicates payload 410 to token handler 114.

In some embodiments, when token handler 114 receives payload 406 from device 104, token handler 114 calls an internal or external service indicated in token 309 and stores the result of this service call in memory 120. When data originator 108 establishes a connection with token handler 114, data originator 108 may see the status of the request in status queue 342 indicating that the request to the internal or external services has completed and results or response, if any, are ready.

If the token 309 specifies that PII 116 should be made available to data originator 108, token handler 114 decrypts payload 410 using private key 222 of token handler 114 to produce PII 116. Token handler 114 then provides PII 116 to data originator 108. In certain embodiments, token handler 114 may provide PII 116 to data originator 108 by encrypting PII 116 using public key 392 of data originator 108 and then communicating the encrypted PII 116 to data originator 108. In this manner, data originator 108 is provided PII 116 after user 102 consents to the redemption of PII 116.

In certain embodiments, when token handler 114 receives payload 410 from device 104, it decrypts payload 410 with a private key 222 of the token handler 114 and encrypts payload 410 with a public key 392 of data originator 108 and places it into a cache and notifies data originator 108 that payload 410 is ready. In certain embodiments, token handler 114 encrypts payload 410 a second time with public key 220 of token handler 114 before placing PII 116 twice encrypted into the cache. Data originator 108 then requests PII 116 from the cache, and in response token handler 114 decrypts PII 116, now encrypted with only a public key 392 of the data originator 108, and presents it to data originator 108.

In certain embodiments, token 309 is redeemed to accomplish tasks other than redeeming PII 116. For example, token 309 may be redeemed for another token 309 that is associated with different privileges and rights. Data originator 108 and/or device 104 may communicate token 309 to token handler 114 along with a request 412. Request 412 may indicate the type of task that is being requested (e.g., redeem PII 116, store PII 116, generate new token 309, etc.). If request 412 indicates that a new token 309 is to be generated, token handler 114 may determine the features of the new token 309 based on other information within request 412. For example, request 412 may indicate the changes between token 309 and new token 309. In response, token handler 114 may insert request 412 and/or token 309 into instruction queue 340. When device 104 notices that request 412 and/or token 309 is in instruction queue 340, device 104 may request consent from user 102 for the generation of new token 309. When consent is given, token handler 114 may generate new token 309 that includes the changes to token 309 and update the status of request 412 in status queue 342. Device 104 and/or data originator 108 may retrieve new token 309 from token handler 114 in response to the updated status of request 412 in status queue 342. The ability to request generation of new token 309 may allow access rights and/or privileges to be altered without altering or accessing PII 116 or any other sensitive information of user 102. For example, user 102 may change information such as access rights, membership subscription, and/or logging requirements without having other components of system 100 accessing PII 116 or other sensitive information of user 102.

FIG. 4B shows a method 420 for redeeming PII 116 in system 100. Generally, PII 116 is redeemed after user 102 consents to the redemption of PII 116.

Token handler 114 receives token 309 and/or anonymized data 304 and ledger ID 308 in step 422. Token handler 114 may have received token 309 and/or anonymized data 304 and ledger ID 308 from data originator 108. In some embodiments, token handler 114 received token 309 and/or anonymized data 304 and ledger ID 308 from device 104. For example, data originator 108 may have asked user 102 to provide PII 116. In response, device 104 communicates token 309 and/or anonymized data 304 and ledger ID 308 to token handler 114.

Token handler 114 generates payload 402 in step 424. Payload 402 may be generated using token 309 and/or anonymized data 304 and ledger ID 308. Token handler 114 inserts payload 402 into instruction queue 340 in step 426. Token handler 114 then waits for device 104 to poll token handler 114.

In step 428, device 104 establishes a connection with token handler 114. Token handler 114 then updates status queue 342 to pending in step 430. Device 104 may establish a connection with token handler 114 and determine that payload 402 is in instruction queue 340 indicating a request for PII 116. Device 104 generates notification 404 in step 432 to seek consent from user 102 to the redemption of PII 116. Device 104 receives consent in step 434. In response, device 104 decrypts payload 302 with salted passphrase 214 and then encrypts with public key 392 of data originator 108 to produce payload 406 in step 436. Device 104 communicates payload 406 to token handler 114. In some embodiments, device 104 decrypts payload 302 with salted passphrase 214 and then communicates the result to token hander 114. Token handler 114 then encrypts using public key 392 of data originator 108 to produce payload 406.

Token handler 114 updates status queue 342 to ready and stores payload 406 in step 438. Token handler 114 then waits for data originator 108 to poll token handler 114. After data originator 108 establishes a connection with token handler 114, data originator 108 determines that the status of the request in status queue 342 is ready and retrieves payload 406 from token handler 114. Data originator 108 then decrypts payload 406 with private key 408 of data originator 108 to produce payload 410 in step 440. Data originator 108 then communicates payload 410 to token handler 114. Token handler 114 then decrypts payload 410 using private key 222 of token handler 114 to produce PII 116 in step 442. Token handler 114 then provides PII 116 to data originator 108. For example, token handler 114 may encrypt PII 116 using public key 392 of data originator 108 and communicate the result to data originator 108. As another example, token handler 114 may request that data originator 108 call a dispatch who can provide PII 116 over the telephone. As yet another example, token handler 114 may communicate the result (e.g., an encrypted telephone number of user 102) to another service, such as a telephone carrier, to allow data originator 108 to contact user 102.

Modifications, additions, or omissions may be made to method 420 depicted in FIG. 4B. Method 420 may include more, fewer, or other steps. For example, steps may be performed in parallel or in any suitable order. Any suitable component of system 100 may perform one or more steps of the method 420.

V. Subsequent Device Registration

Figure 5A:
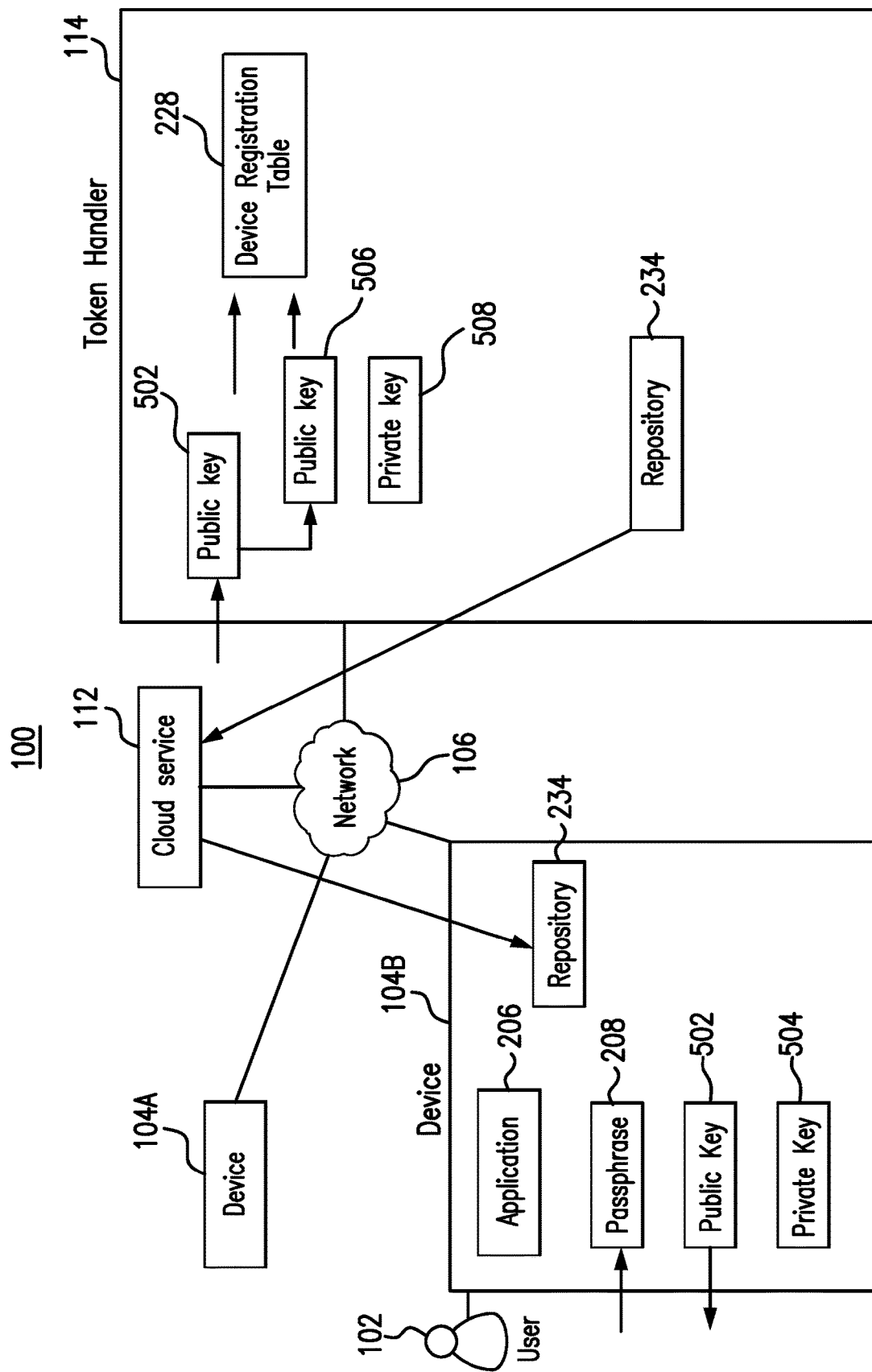
FIGS. 5A-5B illustrate an example device registration in the system of FIG. 1.
Figure 5B:
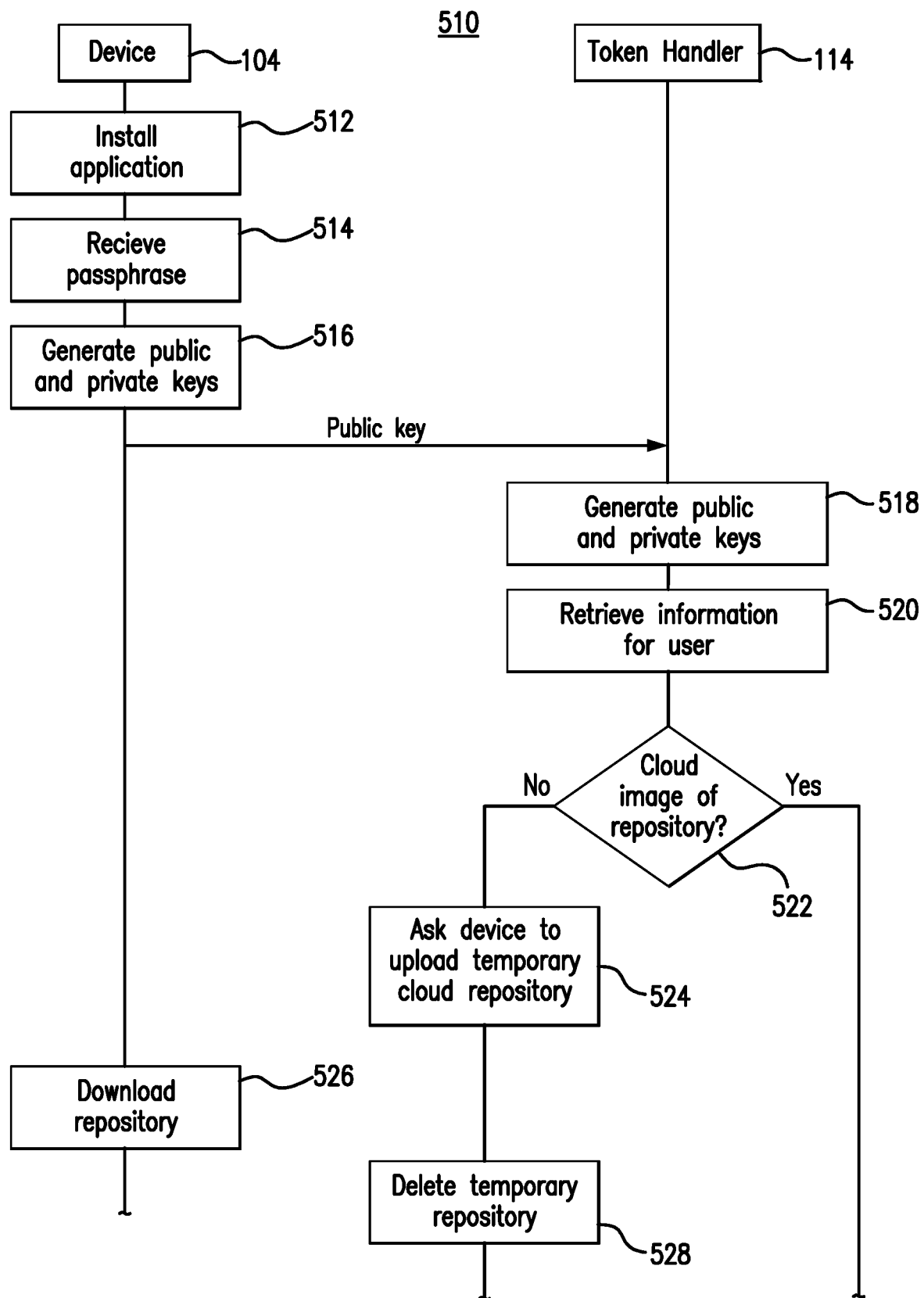

FIGS. 5A and 5B show an example of subsequent device registration. Generally, user 102 can register additional devices 104 into system 100. Each registered device 104 is given a copy of the repository 234.

FIG. 5A shows an example of subsequent device registration in system 100. As seen in FIG. 5A, user 102 maintains two devices 104A and 104B. Device 104A has been previously registered with system 100. User 102 is attempting to register the second device 104B in the example of FIG. 5A.

User 102 downloads application 206 to device 104B. User 102 may then install application 206 to device 104B. When device 104B executes application 206, user 102 may provide account credentials to application 206. For example, user 102 may provide passphrase 208 and/or user ID 226. Device 104B then generates a public key 502 and a private key 504 for device 104B. Device 104B communicates public key 502 to token handler 114.

Token handler 114 receives public key 502 from device 104B. Token handler 114 then generates public key 506 and private key 508 for token handler 114 based on public key 502. Token handler 114 then adds information about device 104B to device registration table 228. In this manner, device registration table 228 may associate device 104B with user 102. Device registration table 228 thus shows that user 102 is associated with two devices: 104A and 104B.

Token handler 114 then initiates the process for duplicating repository 234 onto device 104B. In some embodiments, cloud service 112 maintains a copy of repository 234. In these embodiments, device 104B downloads a copy of repository 234 from cloud service 112. In some embodiments cloud service 112 does not maintain a copy of repository 234. In these embodiments, token handler 114 and/or device 104A uploads a temporary copy of repository 234 to cloud service 112. Device 104B then downloads a copy of repository 234 from cloud service 112. After the download is complete, device 104B and/or token handler 114 deletes the copy of the repository 234 from cloud service 112. In this manner device 104B, is registered to system 100 and user 102 may use device 104A or device 104B to interact with other components of system 100.

FIG. 5B shows an example method 510 for registering subsequent devices 104 in system 100. In step 512, device 104 installs application 206. Device 104 then receives passphrase 208 in step 514. In step 516, device 104 generates public and private keys 502 and 504. Device 104 then communicates public key 502 to token handler 114. Token handler 114 generates public and private keys 506 and 508 in step 518. Token handler 114 then retrieves information for user 102 from a device registration table 228 in step 520. Token handler 114 determines whether a cloud image of repository 234 exists in step 522. If the cloud image does not exist, token handler 114 asks device 104 to upload a temporary cloud repository in step 524. In step 526, device 104 downloads repository 234 from the cloud. In step 528, token handler 114 deletes the temporary repository 234 in the cloud if it was determined in step 522 that no cloud image of the repository 234 existed. In some embodiments, device 104 deletes the temporary repository 234 in the cloud after downloading temporary repository 234.

Modifications, additions, or omissions may be made to method 510 depicted in FIG. 5B. Method 510 may include more, fewer, or other steps. For example, steps may be performed in parallel or in any suitable order. Any suitable component of system 100 may perform one or more steps of the method 510.

VI. Key Management

Figure 6A:
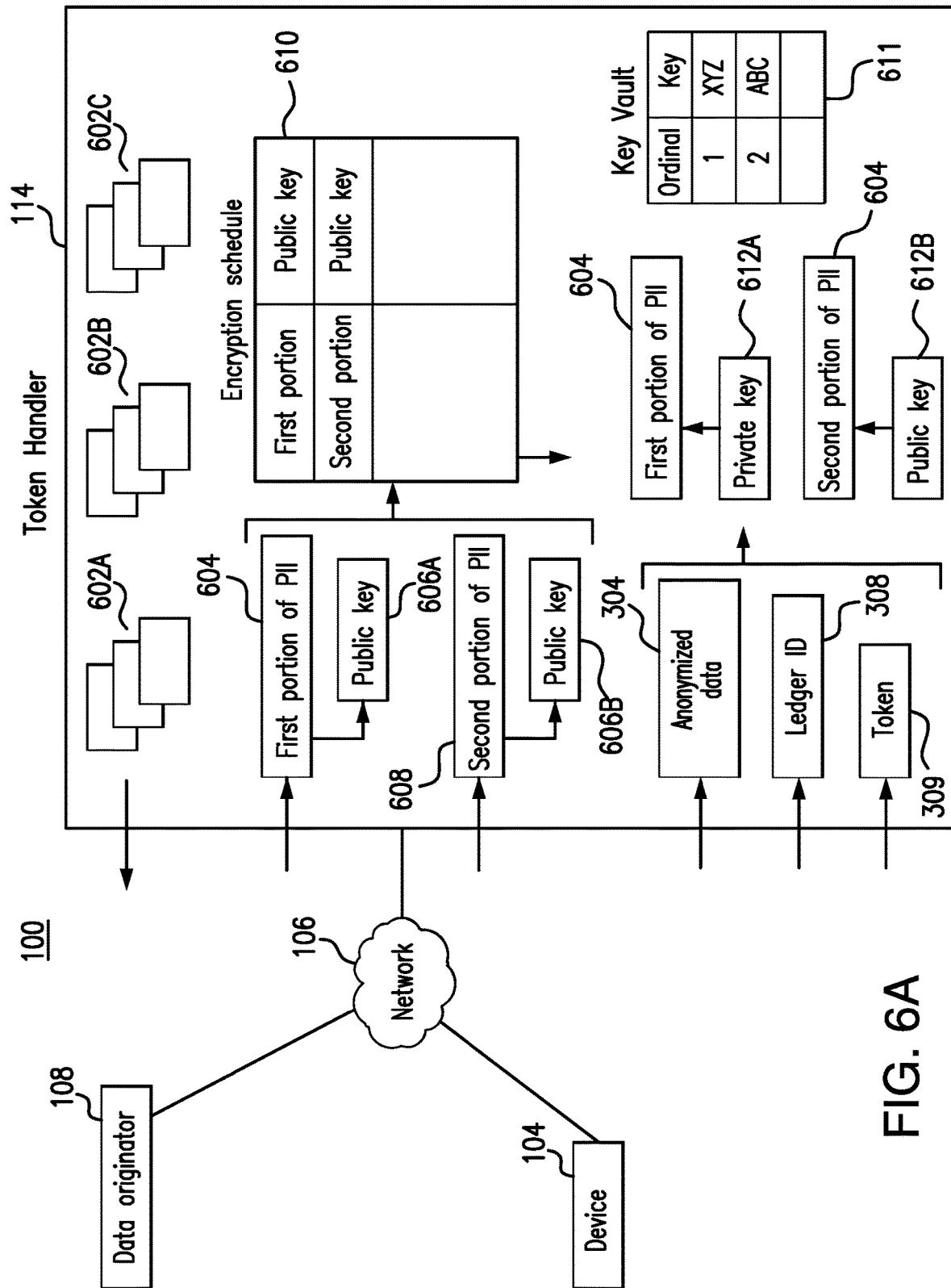
FIGS. 6A-6C illustrate an example key management scheme in the system of FIG. 1.
Figure 6B:
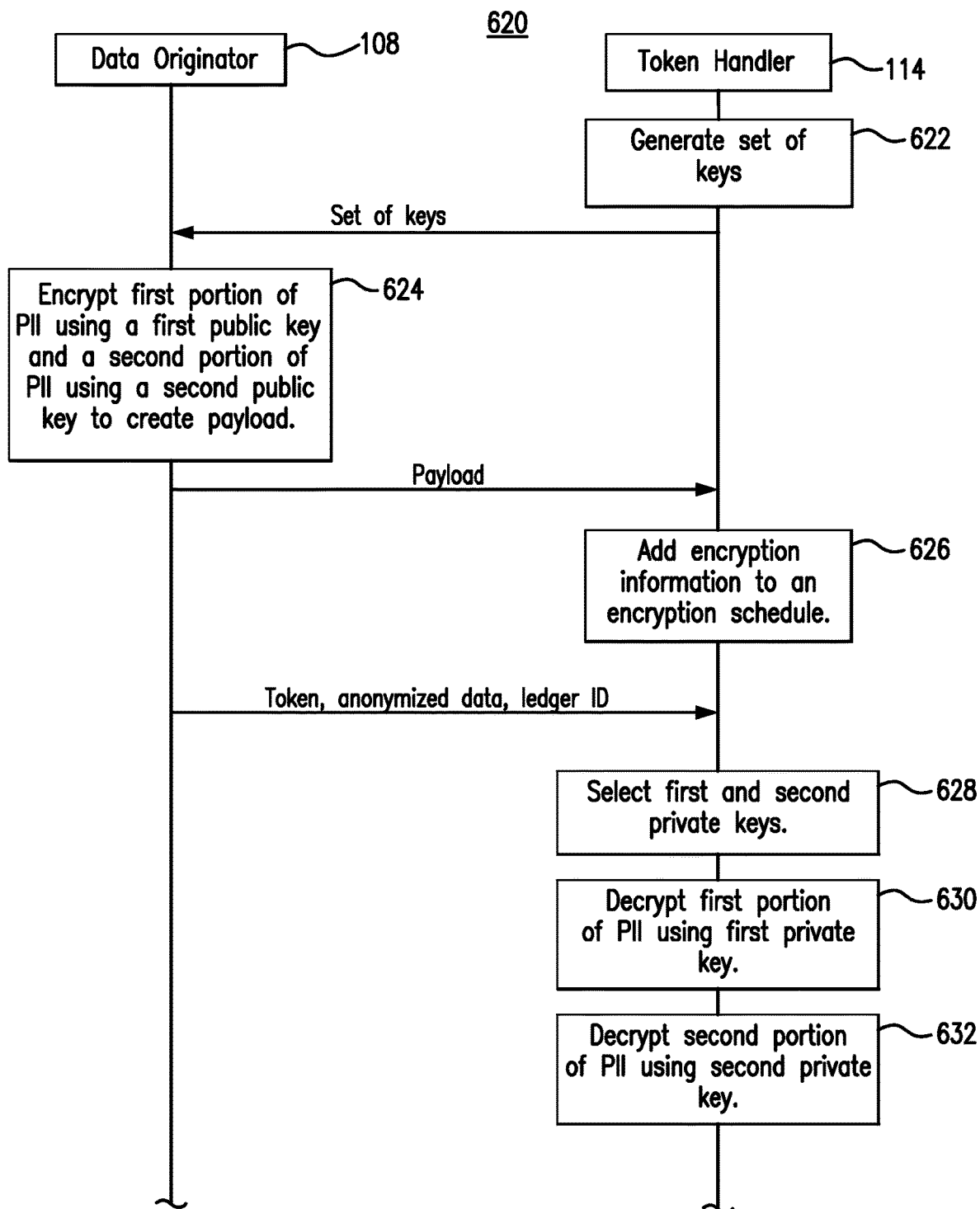
Figure 6C:
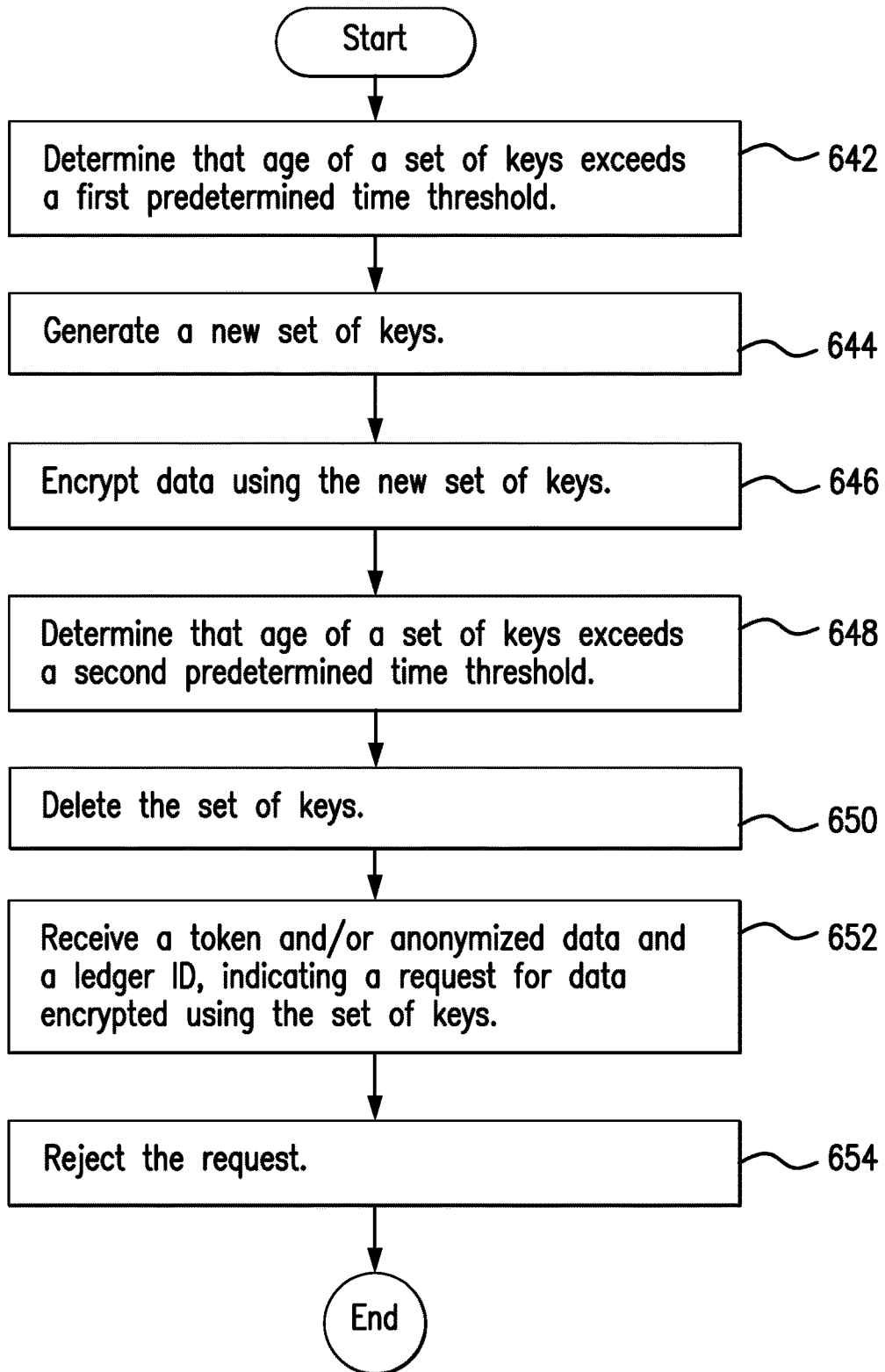

FIGS. 6A-6C show an example key management scheme in system 100. Generally, token handler 114 uses a set of keys to encrypt PII such that different keys are used to encrypt different portion of the PII. In this manner, even if a malicious user takes a key, the malicious user would not be able to decrypt all of the PII. Additionally, token handler 114 generates new set of keys periodically and also deletes old sets of keys periodically. As a result, even if a malicious user takes a key, the usefulness of that key is time limited.

FIG. 6A shows an example of the key management scheme. As seen in FIG. 6A, token handler 114 generates and maintains multiple sets of keys 602. In the example of FIG. 6A, token handler 114 has generated and maintained a first set of keys 602A, a second set of keys 602B, and a third set of keys 602C. Token handler 114 may have generated each set of keys 602 at different times. For example, token handler 114 may generate a new set of keys 602 every month. In the first month, token handler 114 generated set 602A. In the second month, token handler 114 generated set 602B. In the third month, token handler 114 generated set 602C. Token handler 114 communicates these sets 602 of keys to other components of system 100, such as device 104 and data originator 108.

These components use keys 606 from the set 602 to encrypt PII 116. These components then send the encrypted PII 116 to token handler 114. In certain embodiments, these components use different keys 606 to encrypt different portions of PII 116. In the example of FIG. 6A, the components encrypt first portion 604 of PII 116 using public key 606A. The components encrypt second portion 608 of PII 116 using a second public key 606B. Public keys 606A and 606B belong to the same set 602. For example, public key 606A and 606B may belong to set 602A. Portions 604 and 608 may be different attributes of PII 116. For example, first portion 604 may be an email address and second portion 608 may be a social security number. By encrypting different portions 604 and 608 of PII 116 using different keys 606, the impact of a key 606 being taken by a malicious user is reduced. For example, if public key 606A or its corresponding private key were taken by a malicious user, the malicious user would not be able to access second portion 608 of PII 116 using those keys. In certain embodiments, the components of system 100, such as data originator 108 and device 104, randomly select keys 606 from the most current set 602 of keys to encrypt information. In this manner, it may be more difficult for a malicious user to determine which key 606 was used to encrypt a piece of information.

Token handler 114 adds to an encryption schedule 610 information about which keys 606 were used to encrypt the various portions 604 and 608 of PII 116. In the example of FIG. 6A, encryption schedule 610 shows that first portion 604 was encrypted using public key 606A and second portion 608 was encrypted using public key 606B. Token handler 114 may refer to encryption schedule 610 when PII 116 is requested to determine the keys 606 that were used to encrypt the various portions 604 and 608 of PII 116. Token handler 114 may then select the correct corresponding key to decrypt first portion 604 and second portion 608. Token handler 114 may communicate encryption schedule 610 to other components of system 100, such as device 104 and data originator 108, so that these components can refer to the encryption schedule 610 to determine which keys were used to encrypt certain information. For example, token handler 114 may communicate encryption schedule 610 to device 104 and/or data originator 108 when device 104 and/or data originator 108 establish a connection with token handler 114. In some embodiments, token handler 114 communicates one or more applicable keys 606 to a requesting component of system 100 rather than communicating encryption schedule 610 to these components. In other words, token handler 114 determines which keys 606 are applicable in response to a request and communicates those keys 606 to the requesting component. In this manner, the requesting component is not tasked with maintaining the encryption schedule 610 and with determining the applicable keys.

Token handler receives token 309 and/or anonymized data 304 and ledger ID 308, which indicates a request to redeem PII 116. As a result token handler 114 refers to encryption schedule 610 to determine how to decrypt the various portions of PII 116. In the example of FIG. 6A, token handler 114 determines that first portion 604 of PII 116 was encrypted using public key 606A. As a result, token handler 114 uses private keys 612A that corresponds to public key 606A to decrypt first portion 604 of PII 116. Token handler 114 determines from the encryption schedule 610 that second portion 608 of PII 116 was encrypted using public key 606B. In response, token handler 114 uses private key 612B which corresponds to public key 606B to decrypt second portion 608 of PII 116.

Token handler 114 may maintain a key vault 611 that stores the various keys 606 and 612 used to encrypt and/or decrypt information. Alternatively, token handler 114 may use an external or third-party key management system, referencing and caching keys stored in that system. Each key in key vault 611 is identified by an ordinal. The key vault 611 also maintains the key value for each ordinal. By referring to key vault 611 and specific ordinals, token handler 114 may retrieve the keys that are used to encrypt and decrypt PII 116. In some embodiments, the ordinals identify references to keys. The references may be used to identify keys stored in key vault 611. If a malicious user were to gain access to the ordinals, the malicious user would need to map the ordinals to their appropriate references and then use the references to access the keys in key vault 611. Thus, an additional layer of security is added by using ordinals and references. In certain embodiments, token handler 114 determines whether the age of a set 602 of keys exceeds a threshold based on the ordinals of the keys in that set 602. For example, if each set 602 includes ten keys, then ordinals 1 through 10 belong to a first set 602 and ordinals 11 through 20 belong to a second set 602. The second set 602 would have been generated a time period after the first set 602. When the ordinals indicate that the set 602 is older than another threshold, that set 602 can be deleted. In some embodiments, token handler 114 also identifies keys based on their ordinals. For example, encryption schedule 610 may identify which key was used to encrypt certain information using the ordinals of those keys.

In certain embodiments, token handler 114 generates a new set 602 of keys periodically. For example, token handler 114 may generate set 602A in the first month, set 602B in the second month, and set 602C in the third month. When token handler 114 generates a new set 602 of keys, token handler 114 may use keys from that set 602 to encrypt information moving forward until another set 602 of keys is generated. Token handler may use set 602A to encrypt information until the age of set 602A exceeds a threshold (e.g., one month). When the age of set 602A exceeds one month, token handler 114 may generate set 602B and begin using set 602B to encrypt information. When the age of set 602B exceeds one month, token handler 114 may generate set 602C and begin using set 602C to encrypt information.

In some embodiments, token handler 114 re-encrypts previously encrypted information (e.g., first portion 604 and second portion 608) when a new set of keys is generated. For example, if public keys 606A and 606B were in first set 602A, then when token handler 114 generates set 602B, token handler 114 may use public keys in set 602B to re-encrypt first portion 604 and second portion 608. In this manner, the encryption of the first portion 604 and the second portion 608 are kept up-to-date. In certain embodiments, token handler 114 may first verify that first portion 604 and second portion 608 are unchanged or untampered before re-encrypting using the newly generated set of keys. In this manner, the generation of a new set of keys does not present an opportunity for a malicious actor to change the PII 116.

For example, when device 104 connects to token handler 114 to request instructions (e.g., from instruction queue 340), token handler 114 may provide device 104 with an ordinal. Device 104 may then compare that ordinal with stored ordinals to determine if any of the stored ordinals are expired or outdated. For example, if the provided ordinal is greater than a stored ordinal, then the stored ordinal may be expired or outdated. Device 104 may then initiate an operation that is equivalent to a data redemption and then a data push for data that corresponds to a key for the expired or outdated ordinal. This operation may be handled at a lower priority by token handler 114, which may result in the data being re-encrypted with keys from the latest key windows. The re-encrypted data may then be stored on device 104 with ordinals for the latest encryption keys. This operation may include the steps: (1) device 104 uses the active passphrase 208 to partially decrypt the data; (2) device 104 passes the partially decrypted data as a payload to the special key rotation queue; the payload includes the old encryption schedule and the new one; (3) token handler 114 removes the payload from queue; (4) token handler 114 decrypts the data with the corresponding old token handler 114 private key(s); (5) if the data is permanent data, then the data is supplied to data originator 108 for decryption and re-encryption with a new key; (6) token handler 114 encrypts the data with a new key from the current window; (7) token handler 114 removes the old encryption schedule from the payload and places the resulting payload into instruction queue 340 for device 104; (8) when connected and executing instructions, device 104 re-encrypts and stores the data and new encryption schedule. In one embodiment, data is processed one data push payload or redemption schedule at a time. In some embodiments, many push payloads are processed at once.

In one embodiment, system 100 takes a lazy approach to re-encrypting the data. Device 104 does not proactively determine which data should be encrypted and initiate data re-encryption. Instead, when a data redemption request comes in, device 104 compares the ordinals in the encryption schedule with the ordinal provided by token handler 114. If the provided ordinal is greater than a corresponding ordinal in the encryption schedule, then a data push request is placed into instruction queue 340, causing the data to be re-encrypted. If the ordinals in the current encryption schedule correspond to keys that have been deleted, then system 100 returns an error. In some embodiments, the data on device 104 encrypted with out-of-date keys is destroyed, making it impossible for an attacker to decrypt data using captured keys, thus further enhancing the security of system 100.

In certain embodiments, data re-encryption also occurs when user 102 changes passphrases 208. The user's 102 passphrases 208 are also represented by ordinals. In one embodiment, the user's 102 old passphrase 208 is encrypted with the new passphrase 208 and stored into the user's 102 repository. Device 104 submits requests for all obsolete data to be re-encrypted with the new passphrase 208. A marker instruction is added to instruction queue 340. When device 104 reaches this instruction, it marks the old passphrase 208 "obsolete"; thereafter, redemption requests for data encrypted with the old passphrase 208 are rejected. In one embodiment, such invalid requests are detected by, and rejected at, device 104; in another embodiment, device 104 communicates the ordinal of the current passphrase 208 to token handler 114, and token handler 114 rejects invalid data redemptions before they reach device 104. In one embodiment, when all data has been re-encrypted with the new passphrase 208, the obsolete passphrase 208 encrypted with the new passphrase 208 is deleted and/or all data encrypted with the old passphrase 208 is deleted, making it impossible to find data encrypted with a captured passphrase 208 and further enhancing the security of system 100.

In some embodiments, token handler 114 deletes sets 602 of keys when the age of the set 602 exceeds a predetermined threshold. For example, token handler 114 may delete a set 602 of keys after six months. In this manner if a malicious user were to take keys or a set 602 of keys, the usefulness of those keys would be time limited. For example, if token handler 114 receives a request to redeem PII 116 that was encrypted using a key that has been deleted due to age, token handler 114 may know to reject that request. Using the previous example, token handler 114 may keep set 602A until the age of set 602A exceeds a threshold (e.g., six months). When the age of set 602A exceeds six months, token handler 114 may delete set 602A. Similarly, when the age of sets 602B and/or 602C exceeds six months, token handler 114 may delete sets 602B and/or 602C.

If the security of data originator 108 or token handler 114 is compromised, after the attacker is barred from further access to system 100, token handler 114 or data originator 108 can generate a new key or key flight, and the provided ordinal can be set to this new value or to the origin of the key flight. In this way, even if an attacker gains access to data originator 108 or token handler 114 and captures private encryption keys, data cannot be redeemed using the captured encryption keys, thus enhancing the security of system 100.

FIG. 6B shows an example method 620 of managing keys in system 100. In step 622, token handler 114 generates a set 602 of keys. Token handler 114 then communicates that set 602 of keys to data originator 108. Data originator 108 may use keys from that set 602 of keys to encrypt PII 116 in step 624. For example, data originator 108 may encrypt a first portion 604 of PII 116 using a first public key 606A and a second portion 608 of PII 116 using a second public key 606B to create a payload. Data originator 108 may communicate the payload to token handler 114.

Token handler 114 receives the payload from data originator 108 and adds encryption information to an encryption schedule 610 in step 626. The encryption schedule 610 may indicate that first portion 604 was encrypted using public key 606A and that second portion 608 was encrypted using public key 606B.

Data originator 108 then communicates token 309 and/or anonymized data 304 and ledger ID 306 to token handler 114 indicating a request to redeem PII 116. Token handler 114 selects first and second private keys 612A and 612B in step 628. Token handler 114 may have selected first and second private keys 612A and 612B based on the information in the encryption schedule 610. Token handler 114 decrypts first portion 604 of PII 116 using first private key 612A in step 630. Token handler 114 decrypts second portion 608 of PII 116 using second private key 612B in step 632.

Modifications, additions, or omissions may be made to method 620 depicted in FIG. 6B. Method 620 may include more, fewer, or other steps. For example, steps may be performed in parallel or in any suitable order. Any suitable component of system 100 may perform one or more steps of the method 620.

FIG. 6C shows an example method 640 of managing keys in system 100. In certain embodiments, token handler 114 performs method 640. In step 642, token handler 114 determines that an age of a set 602 of keys exceeds a first predetermined time threshold. In step 644, token handler 114 generates a new set of keys 602. For example, the first predetermined time threshold may have been one month. In response to determining that the set 602 of keys was generated over a month ago, token handler 114 regenerates the new set 602 of keys.

In step 646, token handler 114 encrypts data using the new set 602 of keys. Token handler 114 then determines that an age of the set 602 of keys exceeds a second predetermined time threshold in step 648. A second predetermined time threshold may be a longer period, such as, for example, six months. In step 650, token handler 114 deletes the set 602 of keys. In this manner, it is no longer possible for token handler 114 to encrypt or decrypt information using the set 602 of keys. In step 652, token handler 114 receives token 309 and/or anonymized data 304 and a ledger ID 308 indicating a request for data encrypted using the set 602 of keys.

Token handler 114 rejects the request in step 654 because the set 602 of keys has been deleted. In this manner, token handler 114 improves the security of PII 116 because even if a malicious user were to take a set 602 of keys, the usefulness of that set 602 of key was time limited.

Modifications, additions, or omissions may be made to method 640 depicted in FIG. 6C. Method 640 may include more, fewer, or other steps. For example, steps may be performed in parallel or in any suitable order. Any suitable component of system 100 may perform one or more steps of the method 640.

Generally, system 100 provides several advantages over conventional security systems, as discussed above. For example, when PII 116 is to be stored or updated, system 100 first seeks consent from user 102 for the PII 116 store or update. If the user 102 grants consent, then the system 100 stores the PII 116 in the user's 102 personal device 104 or updates the PII 116 stored in the user's personal device 104, then generates a data access token 309 and anonymized data 304 mapped to the data access token 309. If the anonymized data 304 were to be captured by a malicious user, it would not be possible for the malicious user to determine the user's 102 actual PII 116 from the anonymized data 304. Similarly, if the malicious user were to capture a data access token 309, it would not be possible for the malicious user to determine the user's 102 actual PII 116 from the token 309. If the system 100 or the user 102 learn that a malicious user has captured a data access token 309, and/or wish to block access to PII 116 by means of the anonymized data 304, the token 309 can be removed from the token handler 114, guaranteeing that the PII 116 can no longer be accessed using the specific anonymized data 304, while allowing other anonymized data 304 mapped to other data access tokens 309 continued access to the PII 116.

If an undetected malicious user penetrates the token handler 114 and captures a private key 222 of the token handler 114, the malicious user will not be able to decrypt the data without also learning the user's 102 passphrase and the data used to salt the passphrase and to encrypt the information. Alternatively, a malicious user who has gained access to the token handler 114 may try simulating a request to redeem the user's 102 data and obtaining the user's 102 explicit consent. If the request doesn't match similar requests, the user 102 has reason to withhold this consent, allowing the user 102 a means to thwart a malicious user from accessing their data. Similarly, if the malicious user gains control of the user's 102 device 104 and attempts to decrypt the information from the device 104, the malicious user will fail without the user's 102 salted passphrase 214 and the token handler 114 private key 222. If the malicious user attempts to trigger a redemption flow from the device 104, the malicious user runs the risk of detection by either the user 102 or the token handler 114, resulting in lockdown of the account. Additionally, use restrictions placed on tokens 309, such as a token 309 can only be used one time, or limited number of times, or may be used a limited number of times in a specific interval of time, allow the token handler 114 to mark a user's 102 account with an "at-risk" status, causing the token handler 114 to automatically reject requests to redeem data. In these ways, the security of the PII 116 is improved over conventional systems.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system for protecting personally identifiable information, the system comprising:
   a hardware device configured to:
      generate a public encryption key of the hardware device;
      receive personally identifiable information of a user; and
   a hardware processor separate from the hardware device, the hardware processor configured to generate, based on the public encryption key of the hardware device, a public encryption key of the hardware processor;
   wherein the hardware device is further configured to encrypt the personally identifiable information to produce first encrypted personally identifiable information using at least the public encryption key of the hardware processor;
   wherein the hardware processor is further configured to:
      receive the first encrypted personally identifiable information from the hardware device;
      decrypt the first encrypted personally identifiable information to produce the personally identifiable information;
      generate a token representing the personally identifiable information; and
      receive the token indicating a request for the personally identifiable information;
   wherein the hardware device is further configured to:
      establish a connection with the hardware processor;
      after determining that the hardware processor has received the token indicating the request for the personally identifiable information, prompt the user for consent to provide the personally identifiable information;
      in response to receiving the consent from the user, encrypt the personally identifiable information to produce second encrypted personally identifiable information; and
      communicate the second encrypted personally identifiable information to the hardware processor.

2. The system of claim 1, wherein the hardware processor is further configured to delete the public encryption key of the hardware processor in response to a determination that the public encryption key of the hardware processor has been active for a period of time that exceeds a threshold.

3. The system of claim 1, further comprising a second hardware device, the hardware processor further configured to:
   receive, from the second hardware device, a public encryption key of the second hardware device;
   generate a second public encryption key of the hardware processor based on the public encryption key of the second hardware device; and
   link the second hardware device to the hardware device, wherein the second hardware device is configured to download the personally identifiable information from a cloud after being linked to the hardware device.

4. The system of claim 3, wherein:
   the hardware processor is further configured to receive, from the second hardware device, a salted passphrase associated with the hardware device; and
   linking the second hardware device to the hardware device is accomplished using the salted passphrase.

5. The system of claim 3, wherein the second hardware device is further configured to delete the personally identifiable information from the cloud after downloading the personally identifiable information from the cloud.

6. The system of claim 1, wherein:
   the hardware processor is further configured to communicate the token to the hardware device; and
   the hardware device is further configured to:
      create a local repository;
      store the token in the local repository; and
      push the local repository to a cloud.

7. The system of claim 6, wherein the hardware processor is further configured to:
- encrypt a portion of the personally identifiable information using a public encryption key of an external system and the public encryption key of the hardware processor;
- store, in the cloud, the portion of the personally identifiable information encrypted using the public encryption key of the external system and the public encryption key of the hardware processor;
- receive a request for the portion of the personally identifiable information;
- in response to the request for the portion of the personally identifiable information, retrieve, from the cloud, the portion of the personally identifiable information encrypted using the public encryption key of the external system and the public encryption key of the hardware processor; and
- decrypt the encrypted portion of the personally identifiable information using a private encryption key of the hardware processor to produce the portion of the personally identifiable information encrypted using the public encryption key of the external system.

8. The system of claim 1, wherein the hardware processor is further configured to:
- adjust the personally identifiable information to produce anonymized data; and
- generate an identifier for a ledger storing the anonymized data.

9. The system of claim 1, wherein the hardware processor is further configured to:
- receive a request to lock out the user;
- receive the token indicating a second request for the personally identifiable information after receiving the request to lock out the user; and
- in response to receiving the request to lock out the user, reject the second request for the personally identifiable information.

10. A method for protecting personally identifiable information, the method comprising:
- generating, by a hardware device, a public encryption key of the hardware device;
- receiving, by the hardware device, personally identifiable information of a user;
- generating, by a hardware processor separate from the hardware device, a public encryption key of the hardware processor, wherein the public encryption key of the hardware processor is generated based on the public encryption key of the hardware device;
- encrypting, by the hardware, the personally identifiable information to produce first encrypted personally identifiable information using at least the public encryption key of the hardware processor;
- receiving, by the hardware processor, the first encrypted personally identifiable information from the hardware device;
- decrypting, by the hardware processor, the first encrypted personally identifiable information to produce the personally identifiable information;
- generating a token representing the personally identifiable information;
- receiving, by the hardware processor, the token indicating a request for the personally identifiable information;
- establishing, by the hardware device, a connection with the hardware processor;
- after determining that the hardware processor has received the token indicating the request for the personally identifiable information, prompting, by the hardware device, the user for consent to provide the personally identifiable information;
- in response to receiving the consent from the user, encrypting, by the hardware device, the personally identifiable information to produce second encrypted personally identifiable information; and
- communicating, by the hardware device, the second encrypted personally identifiable information to the hardware processor.

11. The method of claim 10, further comprising deleting, by the hardware processor, the public encryption key of the hardware processor in response to a determination that the public encryption key of the hardware processor has been active for a period of time that exceeds a threshold.

12. The method of claim 10, further comprising:
- receiving, by the hardware processor, from a second hardware device, a public encryption key of the second hardware device;
- generating, by the hardware processor, a second public encryption key of the hardware processor based on the public encryption key of the second hardware device;
- linking, by the hardware processor, the second hardware device to the hardware device; and
- downloading, by the second hardware device, the personally identifiable information from a cloud after being linked to the hardware device.

13. The method of claim 12, further comprising:
- receiving, from the second hardware device, a salted passphrase associated with the hardware device; and
- linking the second hardware device to the hardware device is performed using the salted passphrase.

14. The method of claim 12, further comprising deleting, by the second hardware device, the personally identifiable information from the cloud after downloading the personally identifiable information from the cloud.

15. The method of claim 10, further comprising:
- communicating, by the hardware processor, the token to the hardware device;
- creating, by the hardware device, a local repository;
- storing the token in the local repository; and
- pushing the local repository to a cloud.

16. The method of claim 15, further comprising:
- encrypting, by the hardware processor, a portion of the personally identifiable information using a public encryption key of an external system and the public encryption key of the hardware processor;
- storing, by the hardware processor, in the cloud, the portion of the personally identifiable information encrypted using the public encryption key of the external system and the public encryption key of the hardware processor;
- receiving, by the hardware processor, a request for the portion of the personally identifiable information;
- in response to the request for the portion of the personally identifiable information, retrieving, by the hardware processor, from the cloud, the portion of the personally identifiable information encrypted using the public encryption key of the external system and the public encryption key of the hardware processor; and
- decrypting, by the hardware processor, the encrypted portion of the personally identifiable information using a private encryption key of the hardware processor to produce the portion of the personally identifiable information encrypted using the public encryption key of the external system.

17. The method of claim 10, further comprising:
adjusting, by the hardware processor, the personally identifiable information to produce anonymized data; and
generating, by the hardware processor, an identifier for a ledger storing the anonymized data.

18. The method of claim 10, further comprising:
receiving, by the hardware processor, a request to lock out the user;
receiving, by the hardware processor, the token indicating a second request for the personally identifiable information after receiving the request to lock out the user; and
in response to receiving the request to lock out the user, rejecting, by the hardware processor, the second request for the personally identifiable information.

* * * * *